(12) United States Patent
Morita et al.

(10) Patent No.: US 11,558,431 B2
(45) Date of Patent: Jan. 17, 2023

(54) COMMUNICATION TERMINAL, COMMUNICATION SYSTEM, COMMUNICATION METHOD, AND DISPLAY METHOD

(71) Applicants: Kenichiro Morita, Tokyo (JP); Kumiko Yoshida, Tokyo (JP); Yoichiro Matsuno, Kanagawa (JP)

(72) Inventors: Kenichiro Morita, Tokyo (JP); Kumiko Yoshida, Tokyo (JP); Yoichiro Matsuno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 670 days.

(21) Appl. No.: 15/860,094

(22) Filed: Jan. 2, 2018

(65) Prior Publication Data

US 2018/0191787 A1 Jul. 5, 2018

(30) Foreign Application Priority Data

Jan. 5, 2017 (JP) .............................. JP2017-000714

(51) Int. Cl.
*H04N 7/18* (2006.01)
*H04N 5/232* (2006.01)
(Continued)

(52) U.S. Cl.
CPC ...... *H04L 65/1059* (2013.01); *H04L 65/1069* (2013.01); *H04L 65/765* (2022.05);
(Continued)

(58) Field of Classification Search
CPC ............ H04L 65/1059; H04L 65/1069; H04L 65/605; H04L 67/04; H04L 65/765;
(Continued)

(56) References Cited

U.S. PATENT DOCUMENTS 5,983,263 A * 11/1999 Rothrock ............... H04N 7/147
348/E7.081
6,317,776 B1 * 11/2001 Broussard ............... H04N 7/15
348/E7.083
(Continued)

FOREIGN PATENT DOCUMENTS

EP 2879044 A1 * 6/2015 ........... G06F 3/1462
JP 2004-007283 1/2004
(Continued)

OTHER PUBLICATIONS

Extended European Search Report dated May 7, 2018 in European Patent Application No. 18150312.9, 11 pages.
(Continued)

*Primary Examiner* — Lin Ye
*Assistant Examiner* — John H Morehead, III
(74) *Attorney, Agent, or Firm* — Xsensus LLP

(57) ABSTRACT

A communication terminal includes a memory and circuitry. The memory stores, for each image type information indicating a type of image data, sizes of a plurality of display areas, each display area being a divided area divided from an entire area displayable by a display, in association with required resolutions of image data to be displayed in the corresponding display areas. The circuitry receives, from a communication management system, specific image type information indicating a type of specific image data transmitted from other communication terminal. The circuitry transmits, to the communication management system, specific required resolution, which is a resolution stored in the memory for the specific image type information in association with the size of one of the display areas in which the specific image data is to be displayed.

12 Claims, 25 Drawing Sheets

REQUIRED RESOLUTION MANAGEMENT TABLE
(SPECIAL IMAGE)

IMAGE TYPE INFORMATION: Video_Theta

| DISPLAY SIZE | REQUIRED RESOLUTION |
|---|---|
| 640 × 480 | 1280 × 720 |
| 320 × 180 | 640 × 480 |
| 160 × 90 | 352 × 288 |

(51) Int. Cl.
  *H04N 1/32*       (2006.01)
  *H04L 65/1059*    (2022.01)
  *H04L 65/1069*    (2022.01)
  *H04L 65/75*      (2022.01)
  *H04N 1/00*       (2006.01)
  *H04N 101/00*     (2006.01)

(52) U.S. Cl.
  CPC ..... *H04N 1/00233* (2013.01); *H04N 1/32122* (2013.01); *H04N 5/23206* (2013.01); *H04N 7/181* (2013.01); *H04N 5/23238* (2013.01); *H04N 2101/00* (2013.01); *H04N 2201/0084* (2013.01); *H04N 2201/3247* (2013.01); *H04N 2201/3252* (2013.01)

(58) Field of Classification Search
  CPC ...... H04N 5/2628; H04N 7/152; H04N 7/181; H04N 5/23238; H04N 5/23206; H04N 1/00233; H04N 1/32122; H04N 2101/00; H04N 2201/0084; H04N 2201/3247; H04N 2201/3252; G06T 15/20; G06T 19/006
  USPC ......................................................... 709/231
  See application file for complete search history.

(56) References Cited

U.S. PATENT DOCUMENTS

| | | | | |
|---|---|---|---|---|
| 6,850,267 | B2* | 2/2005 | Hiroi | H04N 7/148 348/14.01 |
| 7,330,875 | B1* | 2/2008 | Parasnis | G06Q 10/10 709/203 |
| 7,554,571 | B1* | 6/2009 | Beck | H04N 7/152 348/14.09 |
| 7,904,513 | B2* | 3/2011 | Kanda | G06F 9/542 709/204 |
| 8,542,265 | B1 | 9/2013 | Dodd et al. | |
| 8,717,399 | B2* | 5/2014 | Izotov | H04L 65/403 348/14.01 |
| 9,035,994 | B2* | 5/2015 | Kato | H04N 7/15 348/14.08 |
| 9,843,840 | B1 | 12/2017 | Banta et al. | |
| 10,104,339 | B1* | 10/2018 | Wang | G06F 3/048 |
| 2002/0038359 | A1* | 3/2002 | Ihara | H04L 12/1822 709/219 |
| 2004/0051780 | A1* | 3/2004 | Sudo | H04N 7/147 348/E7.078 |
| 2004/0254982 | A1* | 12/2004 | Hoffman | H04L 69/329 709/204 |
| 2005/0206659 | A1* | 9/2005 | Cutler | G03B 37/00 345/660 |
| 2005/0280701 | A1* | 12/2005 | Wardell | H04M 3/568 348/14.08 |
| 2008/0079800 | A1* | 4/2008 | Kobayashi | H04N 7/142 348/E7.083 |
| 2008/0211901 | A1* | 9/2008 | Civanlar | H04N 19/61 348/14.09 |
| 2010/0002069 | A1 | 1/2010 | Eleftheriadis et al. | |
| 2010/0118202 | A1* | 5/2010 | Yoshida | G06Q 30/00 348/581 |
| 2011/0223076 | A1* | 9/2011 | Wynn | C12M 23/40 422/310 |
| 2012/0203836 | A1* | 8/2012 | Nishimura | G06F 9/5027 709/204 |
| 2012/0323704 | A1* | 12/2012 | Steelberg | G06Q 30/02 705/14.73 |
| 2013/0141523 | A1* | 6/2013 | Banta | H04N 5/23238 348/36 |
| 2013/0141526 | A1 | 6/2013 | Banta et al. | |
| 2013/0198795 | A1* | 8/2013 | Eleftheriadis | H04N 7/152 725/118 |
| 2013/0262582 | A1* | 10/2013 | Houjou | H04L 51/32 709/204 |
| 2013/0332526 | A1* | 12/2013 | Hurley | G06F 16/176 709/204 |
| 2014/0006488 | A1* | 1/2014 | Mao | G06Q 10/10 709/204 |
| 2014/0067956 | A1* | 3/2014 | Tsunoda | H04L 67/22 709/204 |
| 2014/0118477 | A1 | 5/2014 | Dodd et al. | |
| 2015/0058735 | A1 | 2/2015 | Nagase et al. | |
| 2015/0296141 | A1* | 10/2015 | Zhang | H04N 5/232933 348/39 |
| 2016/0165136 | A1 | 6/2016 | Mitsui et al. | |
| 2016/0366369 | A1* | 12/2016 | Balasaygun | H04N 7/147 |

FOREIGN PATENT DOCUMENTS

| | | |
|---|---|---|
| JP | 2004-254031 | 9/2004 |
| JP | 2005-094713 | 4/2005 |
| JP | 2008-085930 | 4/2008 |
| JP | 2010-166235 | 7/2010 |
| JP | 2011-223076 | 11/2011 |
| JP | 2012-178135 | 9/2012 |
| JP | 2015-056046 | 3/2015 |
| JP | 2015-173424 | 10/2015 |
| JP | 2016-110639 | 6/2016 |

OTHER PUBLICATIONS

U.S. Appl. No. 15/707,490, filed Sep. 28, 2017, Kumiko Yoshida, et al.

U.S. Appl. No. 15/707,553, filed Sep. 18, 2017, Kenichiro Morita, et al.

\* cited by examiner

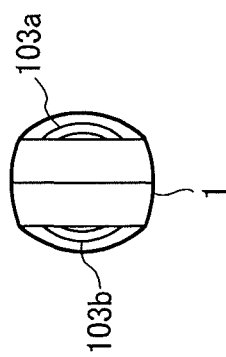
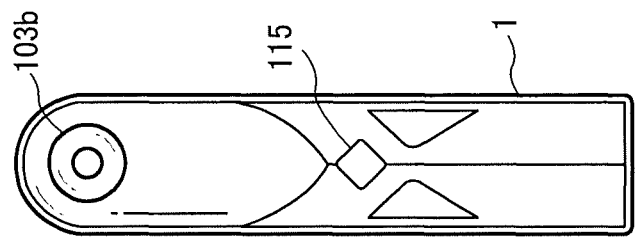
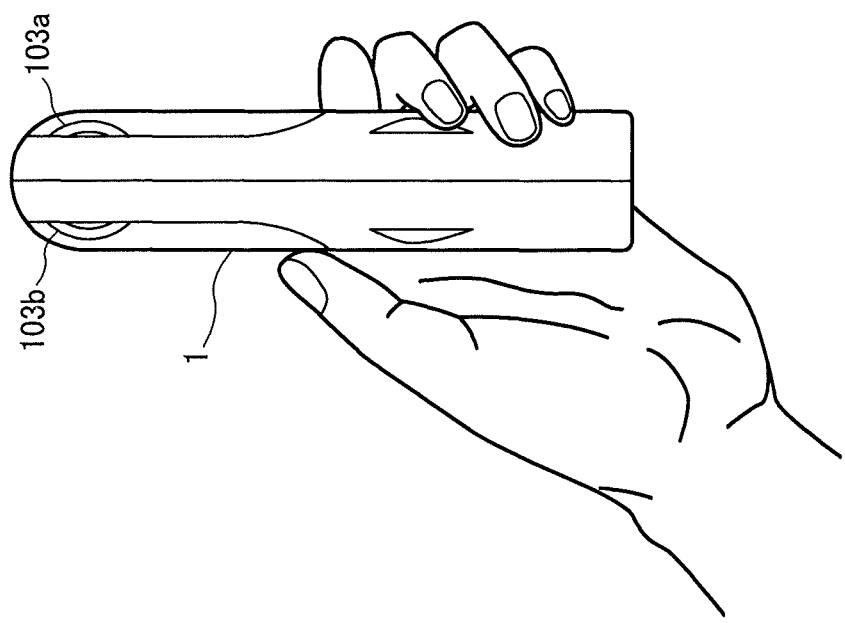

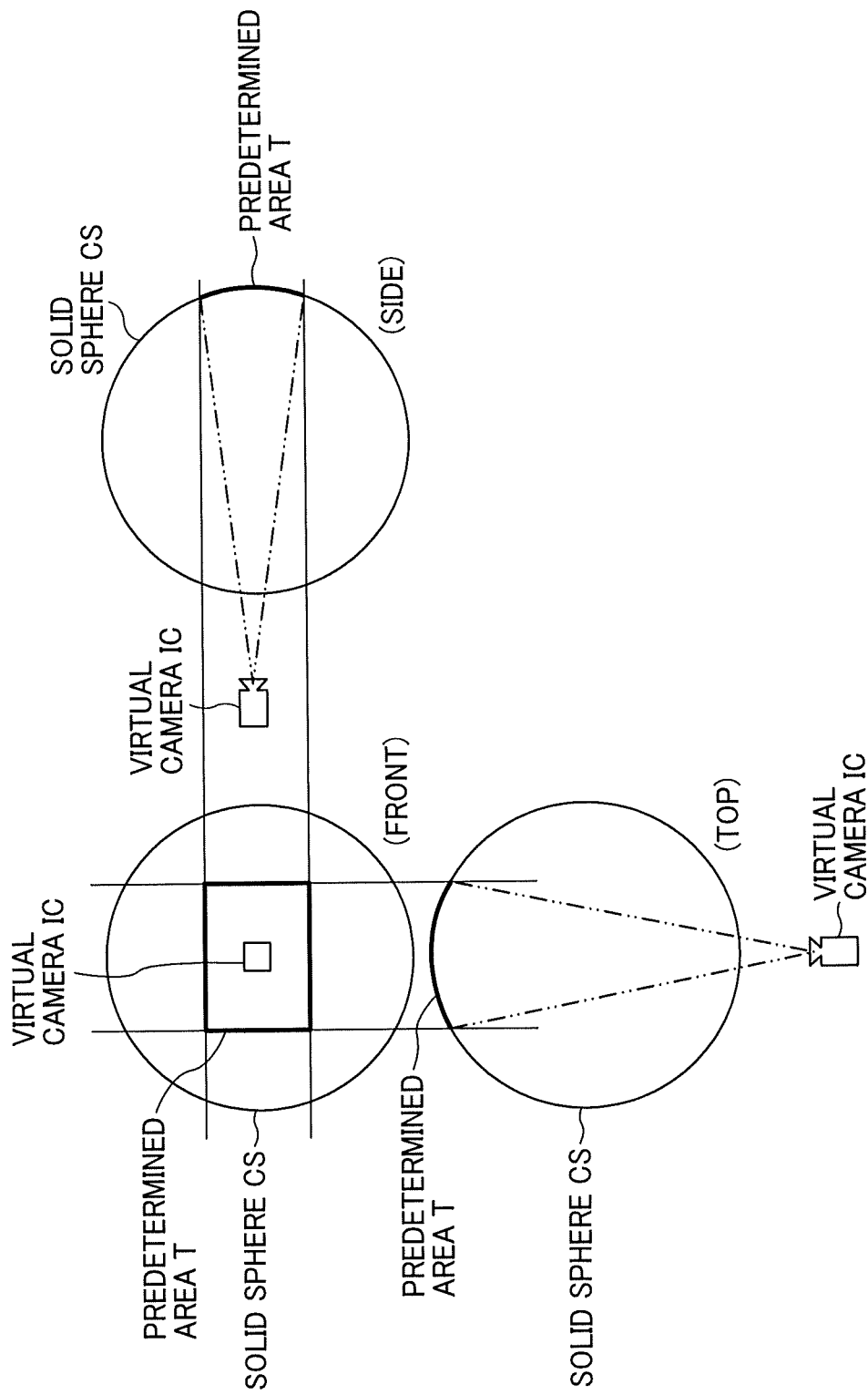

VIRTUAL CAMERA IC
SOLID SPHERE CS
PREDETERMINED AREA T

PREDETERMINED AREA T
DIAGONAL ANGLE OF VIEW 2L
DISTANCE f
CENTRAL POINT CP
VIRTUAL CAMERA IC

FIG. 15

| IMAGE DATA ID | IP ADDRESS OF SENDER TERMINAL | SOURCE NAME (IMAGE TYPE INFORMATION) |
|---|---|---|
| RS001 | 1.2.1.3 | Video_Theta |
| RS002 | 1.2.2.3 | Video_Theta |
| RS003 | 1.3.1.3 | Video |
| RS004 | 1.3.2.3 | Video |

FIG. 16

IMAGE CAPTURING DEVICE MANAGEMENT TABLE

| VENDER ID AND PRODUCT ID OF GUID OF IMAGE CAPTURING DEVICE |
|---|
| vid_05ca&pid_2711 |
| vid_05ca&pid_3822 |
| ... |

FIG. 17A

DISPLAY LAYOUT MANAGEMENT TABLE OF SITE A

| LAYOUT NUMBER | IMAGE DATA ID | DISPLAY SIZE |
|---|---|---|
| 1 | RS003 | 320×180 |
| 2 | RS002 | 160×90 |
| 3 | RS004 | 160×90 |
| 4 | RS001 | 160×90 |

FIG. 17B

DISPLAY LAYOUT MANAGEMENT TABLE OF SITE B

| LAYOUT NUMBER | IMAGE DATA ID | DISPLAY SIZE |
|---|---|---|
| 1 | RS001 | 640×480 |
| 2 | RS003 | 320×180 |
| 3 | RS004 | 320×180 |
| 4 | RS002 | 320×180 |

FIG. 17C

DISPLAY LAYOUT MANAGEMENT TABLE OF SITE C

| LAYOUT NUMBER | IMAGE DATA ID | DISPLAY SIZE |
|---|---|---|
| 1 | RS001 | 320×180 |
| 2 | RS002 | 160×90 |
| 3 | RS004 | 160×90 |
| 4 | RS003 | 160×90 |

FIG. 17D

DISPLAY LAYOUT MANAGEMENT TABLE OF SITE D

| LAYOUT NUMBER | IMAGE DATA ID | DISPLAY SIZE |
|---|---|---|
| 1 | RS001 | 640×480 |
| 2 | RS002 | 320×180 |
| 3 | RS003 | 320×180 |
| 4 | RS004 | 320×180 |

FIG. 18A

REQUIRED RESOLUTION MANAGEMENT TABLE
(SPECIAL IMAGE)

| IMAGE TYPE INFORMATION: Video_Theta | |
|---|---|
| DISPLAY SIZE | REQUIRED RESOLUTION |
| 640 × 480 | 1280 × 720 |
| 320 × 180 | 640 × 480 |
| 160 × 90 | 352 × 288 |

FIG. 18B

REQUIRED RESOLUTION MANAGEMENT TABLE
(GENERAL IMAGE)

| IMAGE TYPE INFORMATION: Video | |
|---|---|
| DISPLAY SIZE | REQUIRED RESOLUTION |
| 640 × 480 | 640 × 480 |
| 320 × 180 | 352 × 288 |
| 160 × 90 | 176 × 144 |

FIG. 19

SESSION MANAGEMENT TABLE

| SESSION ID | IP ADDRESS OF PARTICIPATING TERMINAL |
|---|---|
| se101 | 1.2.1.3, 1.2.2.3, 1.3.1.3 |
| se102 | 1.2.1.3, 1.2.2.3, 1.3.1.3 |
| ... | ... |

FIG. 20

IMAGE TYPE MANAGEMENT DB

| SESSION ID | IMAGE DATA ID | IP ADDRESS OF SENDER TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video_Theta |
| se101 | RS003 | 1.3.1.3 | Video |
| se102 | RS004 | 1.2.1.4 | Video |
| se102 | RS005 | 1.3.1.4 | Video_Theta |
| ... | ... | ... | ... |

FIG. 21

TRANSMISSION RESOLUTION MANAGEMENT TABLE

| SENDER / DESTINATION | IP ADDRESS OF SITE A | IP ADDRESS OF SITE B | IP ADDRESS OF SITE C | IP ADDRESS OF SITE D |
|---|---|---|---|---|
| IP ADDRESS OF SITE A |  | 320×180 | 320×180 | 160×90 |
| IP ADDRESS OF SITE B | 1280×720 |  | 320×180 | 320×180 |
| IP ADDRESS OF SITE C | 640×480 | 320×180 |  | 160×90 |
| IP ADDRESS OF SITE D | 1280×720 | 640×480 | 320×180 |  |

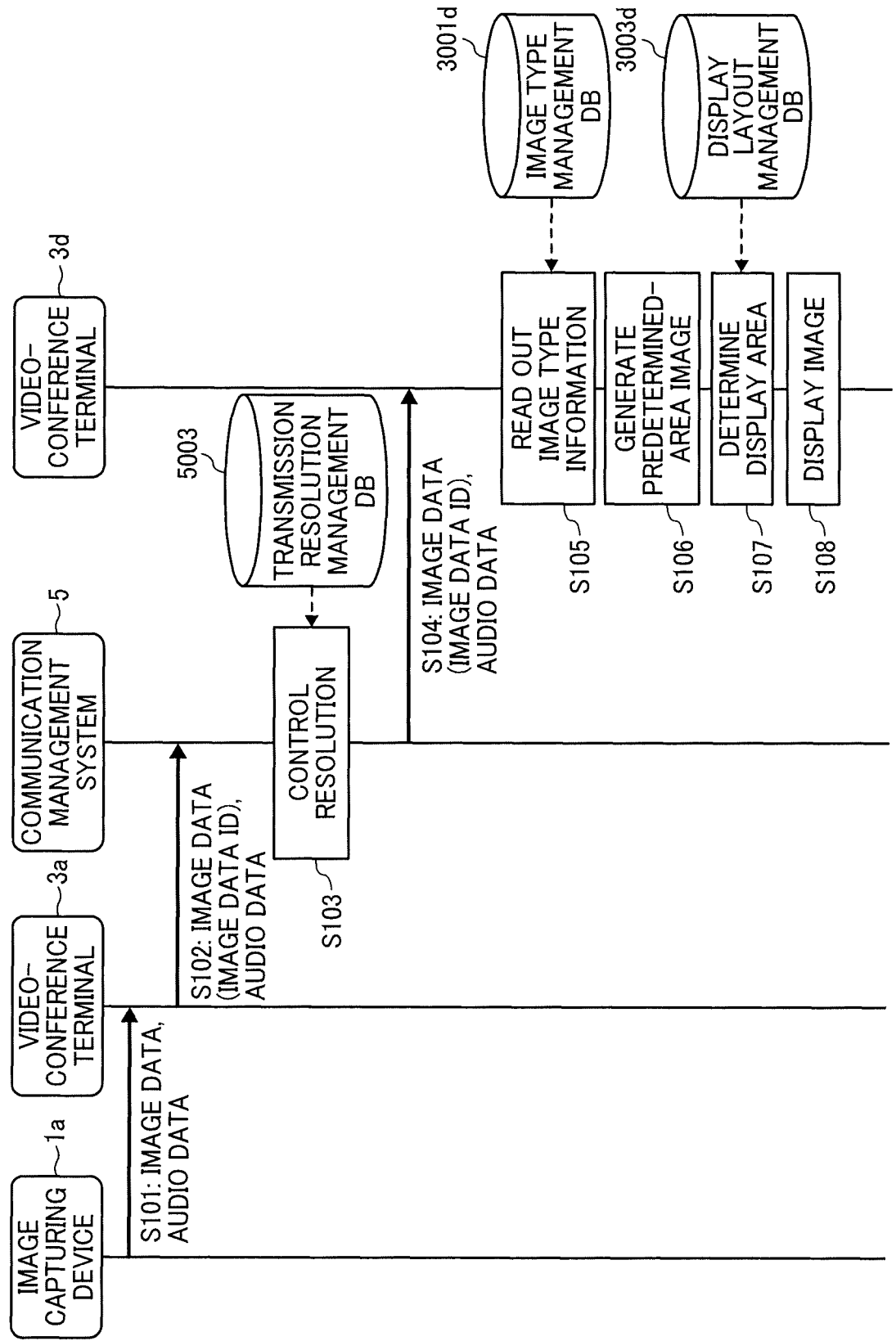

COMMUNICATION TERMINAL, COMMUNICATION SYSTEM, COMMUNICATION METHOD, AND DISPLAY METHOD

CROSS-REFERENCE TO RELATED APPLICATION

This patent application is based on and claims priority pursuant to 35 U.S.C. § 119(a) to Japanese Patent Application No. 2017-000714, filed on Jan. 5, 2017, in the Japan Patent Office, the entire disclosure of which is hereby incorporated by reference herein.

BACKGROUND

Technical Field

The present disclosure relates to a communication terminal, a communication system, a communication method, and a display method.

Description of the Related Art

Videoconference systems are now in widespread use, allowing users at remote places to hold a meeting via a communication network such as the Internet. In such videoconference systems, a communication terminal for a remote conference system is provided in a conference room where attendants of one party in a remote conference are attending. This communication terminal collects an image or video of the conference room including the attendants and sound such as speech made by the attendants, and transmits digital data converted from the collected image (video) and/or sound to the other party's terminal provided at a different conference room. Based on the transmitted digital data, the other party's terminal displays images on a display or outputs audio from a speaker in the different conference room to enable video calling. This enables to carry out a conference among remote sites, in a state close to an actual conference.

In addition, for example, a relay apparatus is known, which receives image data and audio data from a first communication terminal and relays the received image and audio data to a second communication terminal. The second communication terminal requests the relay apparatus for the image data of a desired resolution depending on the resolution of a display of the own terminal. This enables to suppress unnecessary communication, thereby smoothly performing a remote conference without communication being interrupted even in a communication network having a narrow communication band.

On the other hand, a technique is known that connects, to a communication terminal, an image capturing device that is capable of capturing a full spherical panoramic image in real time, and transmits the full spherical panoramic image from the image capturing device to each communication terminal of the other party. Each communication terminal sequentially converts the received full spherical panoramic image to a planar image representing a predetermined area, which is a part of the full spherical panoramic image, and displays the planar image on a display or the like.

SUMMARY

A communication terminal includes a memory and circuitry. The memory stores, for each image type information indicating a type of image data, sizes of a plurality of display areas, each display area being a divided area divided from an entire area displayable by a display, in association with required resolutions of image data to be displayed in the corresponding display areas. The circuitry receives, from a communication management system, specific image type information indicating a type of specific image data transmitted from other communication terminal. The circuitry transmits, to the communication management system, specific required resolution, which is a resolution stored in the memory for the specific image type information in association with the size of one of the display areas in which the specific image data is to be displayed.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 1A is a left side view of an image capturing device according to an embodiment of the present disclosure;

FIG. 1B is a front view of the image capturing device of FIG. 1A;

FIG. 1C is a plan view of the image capturing device of FIG. 1A;

FIG. 5 is a view illustrating positions of a virtual camera and a predetermined area in a case in which the full spherical panoramic image is represented as a three-dimensional solid sphere according to an embodiment of the present disclosure;

FIG. 15 is a conceptual diagram illustrating an image type management table, according to an embodiment of the present disclosure;

FIG. 16 is a conceptual diagram illustrating an image capturing device management table, according to an embodiment of the present disclosure;

FIGS. 17A, 17B, 17C and 17D are conceptual diagrams, each illustrating a display layout management table, according to an embodiment of the present disclosure;

FIGS. 18A and 18B are conceptual diagrams illustrating required resolution management tables for the different image types, according to an embodiment of the present disclosure;

FIG. 19 is a conceptual diagram illustrating a session management table, according to an embodiment of the present disclosure;

FIG. 20 is a conceptual diagram illustrating an image type management table, according to an embodiment of the present disclosure;

FIG. 21 is a conceptual diagram illustrating a transmission resolution management table according to an embodiment of the present disclosure;

FIG. 26 is a sequence diagram illustrating an image data transmission process in video calling, according to an embodiment of the present disclosure;

Figure 2:
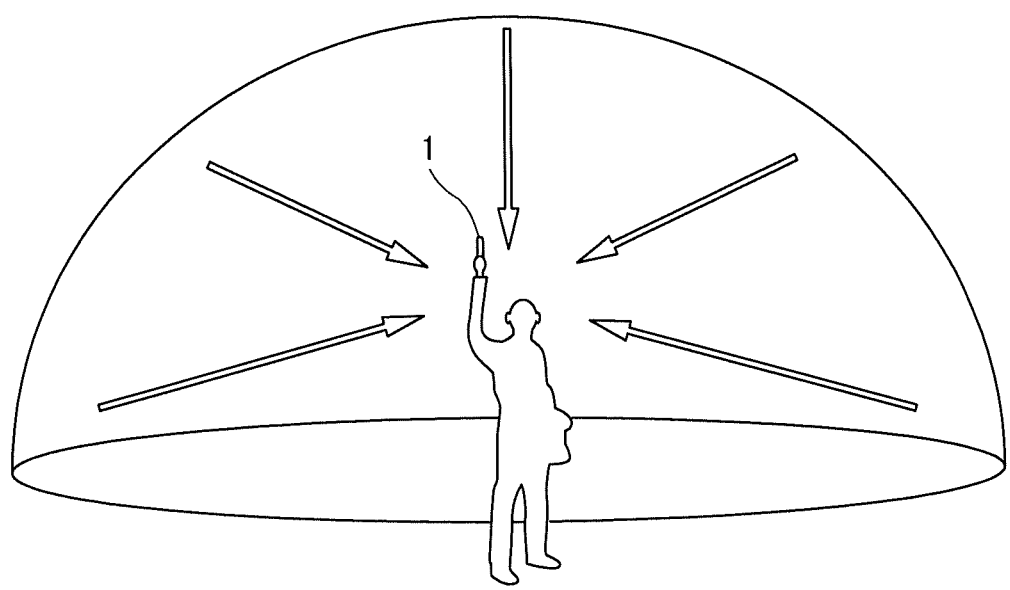
FIG. 2 illustrates how a user uses the image capturing device, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Referring to the drawings, several embodiments of the present invention are described.

Overview of Embodiment

<Generation of Full Spherical Panoramic Image>

With reference to FIGS. 1 to 7, a description is given of generating a full spherical panoramic image.

First, a description is given of an external view of an image capturing device 1, with reference to FIGS. 1A to 1C. The image capturing device 1 is a digital camera for capturing images from which a 360-degree full spherical panoramic image is generated. FIGS. 1A to 1C are respectively a left side view, a front view, and a plan view of the image capturing device 1.

As illustrated in FIG. 1A, the image capturing device 1 has a shape such that one can hold it with one hand. Further, as illustrated in FIGS. 1A to 1C, an imaging element 103a is provided on a front side (anterior side) of an upper section of the image capturing device 1, and an imaging element 103b is provided on a back side (rear side) thereof. These imaging elements (image sensors) 103a and 103b are used in combination with optical members (e.g., fisheye lenses 102a and 102b, described later), each being capable of capturing a hemispherical image having an angle of view of 180 degrees or wider. Furthermore, as illustrated in FIG. 1B, an operation unit 115 such as a shutter button is provided on an opposite side of the front side of the image capturing device 1.

Hereinafter, a description is given of a situation where the image capturing device 1 is used, with reference to FIG. 2. FIG. 2 illustrates an example of how a user uses the image capturing device 1. As illustrated in FIG. 2, for example, the image capturing device 1 is used for capturing objects surrounding the user who is holding the image capturing device 1 in his/her hand. The imaging elements 103a and 103b illustrated in FIGS. 1A to 1C capture the objects surrounding the user to obtain two hemispherical images.

Hereinafter, a description is given of an overview of an operation of generating the full spherical panoramic image from the image captured by the image capturing device 1, with reference to FIGS. 3A to 3C and FIGS. 4A and 4B. FIG.

Figure 3B:
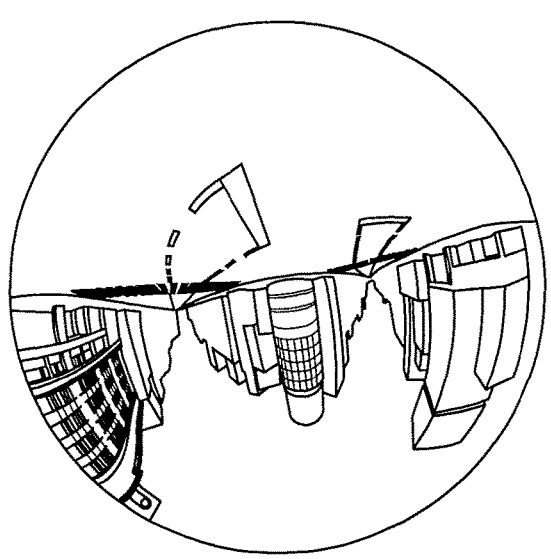
FIG. 3B is a view illustrating a back side of the hemispherical image captured by the image capturing device according to an embodiment of the present disclosure.
Figure 3C:
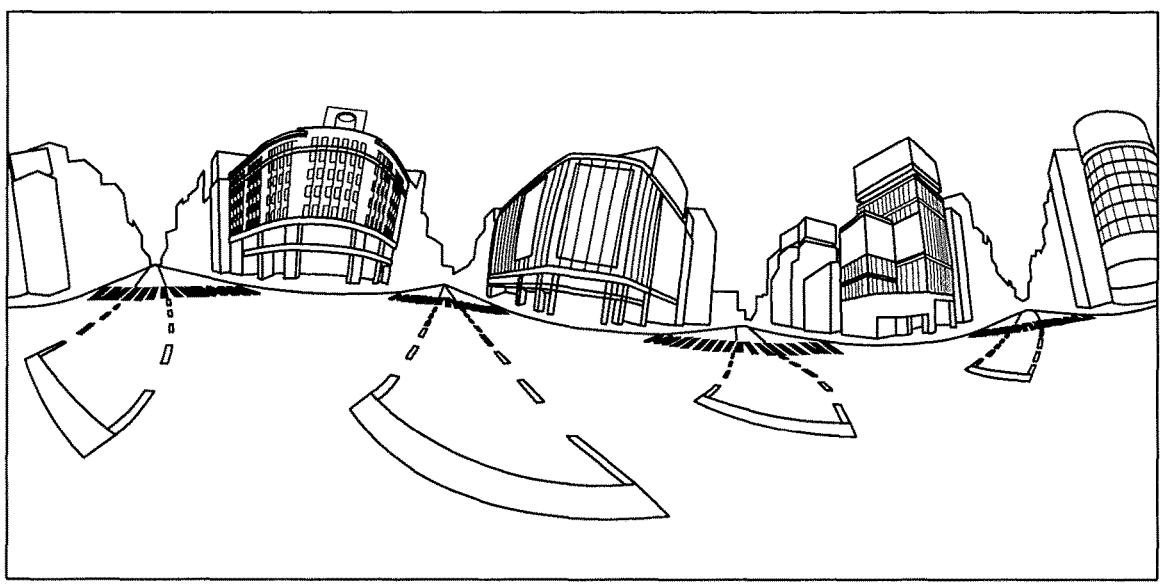
FIG. 3C is a view illustrating an image captured by the image capturing device represented by Mercator projection according to an embodiment of the present disclosure.
Figure 4B:
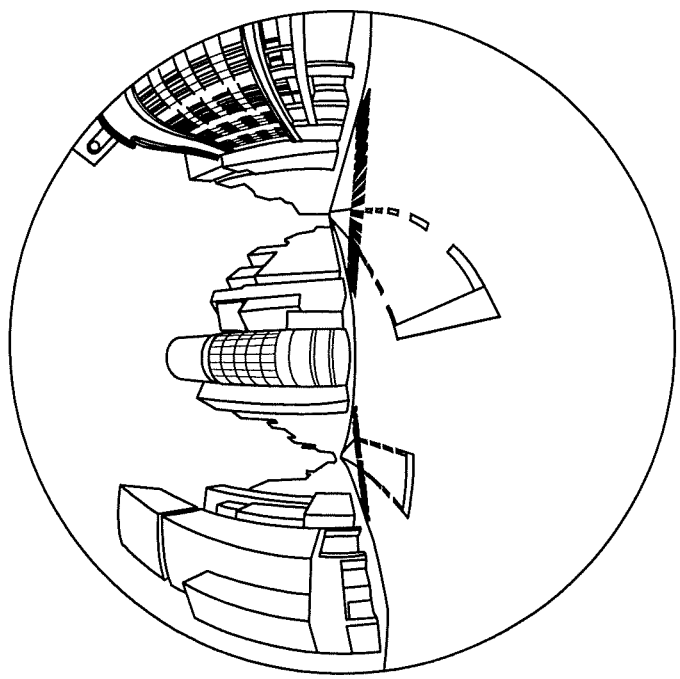
FIG. 4B is a view illustrating a full spherical panoramic image according to an embodiment of the present disclosure.
Figure 4A:
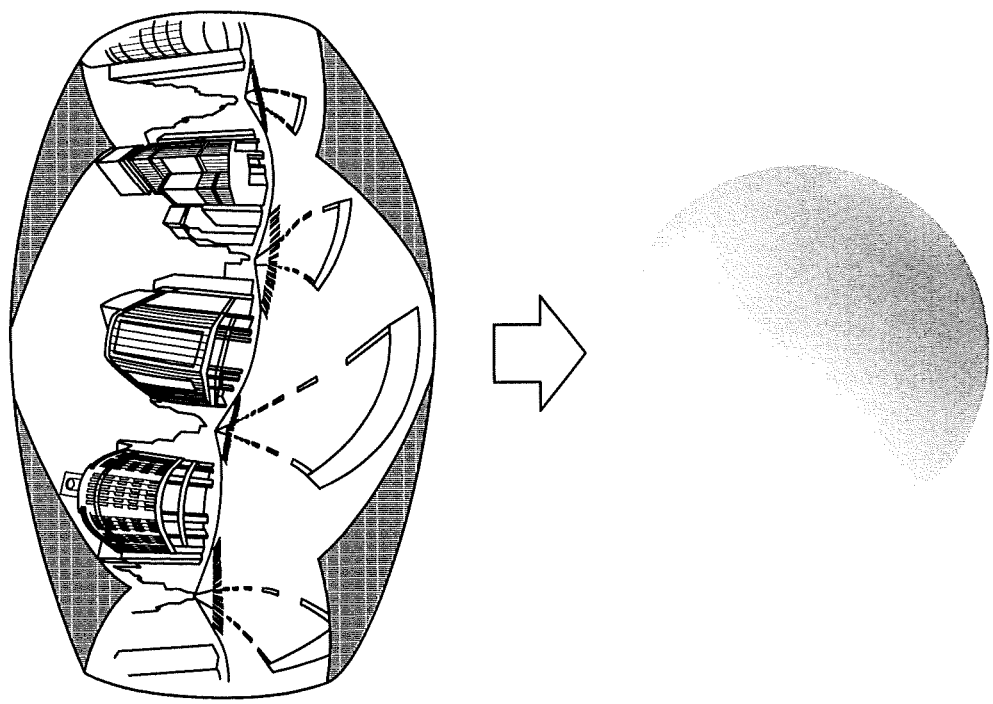
FIG. 4A illustrates how the image represented by Mercator projection covers a surface of a sphere according to an embodiment of the present disclosure.

3A is a view illustrating a hemispherical image (front side) captured by the image capturing device 1. FIG. 3B is a view illustrating a hemispherical image (back side) captured by the image capturing device 1. FIG. 3C is a view illustrating an image represented by Mercator projection. The image represented by Mercator projection as illustrated in FIG. 3C is referred to as a "Mercator image" hereinafter. FIG. 4A illustrates an example of how the Mercator image covers a surface of a sphere. FIG. 4B is a view illustrating the full spherical panoramic image.

Figure 3A:
FIG. 3A is a view illustrating a front side of a hemispherical image captured by the image capturing device according to an embodiment of the present disclosure.

As illustrated in FIG. 3A, an image captured by the imaging element 103a is a curved hemispherical image (front side) taken through the fisheye lens 102a described later. Also, as illustrated in FIG. 3B, an image captured by the imaging element 103b is a curved hemispherical image (back side) taken through the fisheye lens 102b described later. The hemispherical image (front side) and the hemispherical image (back side), which is reversed by 180-degree from each other, is combined by the image capturing device 1. Thus, the Mercator image as illustrated in FIG. 3C is generated.

The Mercator image is pasted on the sphere surface using Open Graphics Library for Embedded Systems (OpenGL ES) as illustrated in FIG. 4A. Thus, the full spherical panoramic image as illustrated in FIG. 4B is generated. In other words, the full spherical panoramic image is represented as the Mercator image facing toward a center of the sphere. It should be noted that OpenGL ES is a graphic library used for visualizing two-dimensional (2D) and three-dimensional (3D) data. The full spherical panoramic image is either a still image or a movie.

One may feel strange viewing the full spherical panoramic image, because the full spherical panoramic image is an image attached to the sphere surface. To resolve this strange feeling, an image of a predetermined area, which is a part of the full spherical panoramic image, is displayed as a planar image having fewer curves. The image of the predetermined area is referred to as a "predetermined-area image" hereinafter. Hereinafter, a description is given of displaying the predetermined-area image with reference to FIG. 5 and FIGS. 6A and 6B.

Figure 6A:
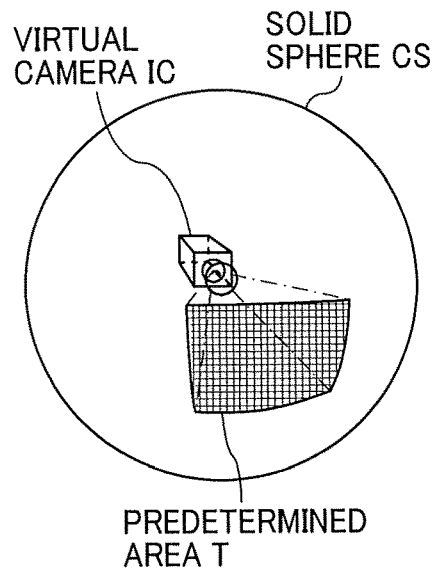
FIG. 6A is a perspective view of FIG. 5.
Figure 6B:
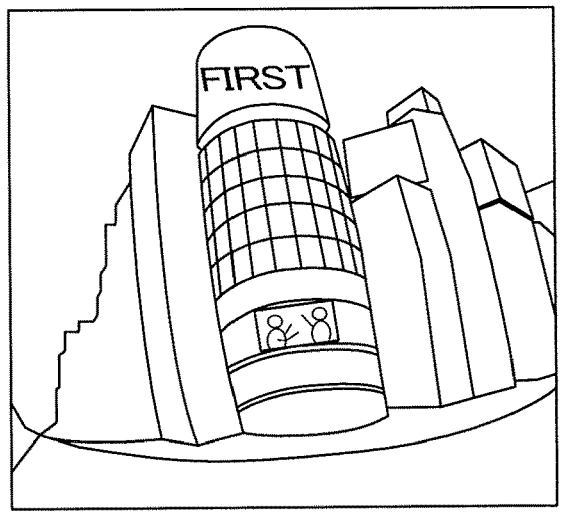
FIG. 6B is a view illustrating an image of the predetermined area on a display of a communication terminal according to an embodiment of the present disclosure.

FIG. 5 is a view illustrating positions of a virtual camera IC and a predetermined area T in a case in which the full spherical panoramic image is represented as a three-dimensional solid sphere. The virtual camera IC corresponds to a position of a point of view (viewpoint) of a user who is viewing the full spherical panoramic image represented as the three-dimensional solid sphere. FIG. 6A is a perspective view of FIG. 5. FIG. 6B is a view illustrating the predetermined-area image displayed on a display. In FIG. 6A, the full spherical panoramic image illustrated in FIG. 4B is represented as a three-dimensional solid sphere CS. Assuming that the generated full spherical panoramic image is the solid sphere CS, the virtual camera IC is outside of the full spherical panoramic image as illustrated in FIG. 5. The predetermined area T in the full spherical panoramic image is an imaging area of the virtual camera IC. Specifically, the predetermined area T is specified by predetermined-area information indicating a position coordinate (x(rH), y(rV), angle of view α (angle)) including an angle of view of the virtual camera IC in a three-dimensional virtual space containing the full spherical panoramic image. Zooming of the predetermined area T is implemented by enlarging or reducing a range (arc) of the angle of view α. Further, zooming of the predetermined area T is implemented by moving the virtual camera IC toward or away from the full spherical panoramic image.

The predetermined-area image, which is an image of the predetermined area T illustrated in FIG. 6A, is displayed as an imaging area of the virtual camera IC, as illustrated in FIG. 6B. FIG. 6B illustrates the predetermined-area image represented by the predetermined-area information that is set by default. In another example, the predetermined-area image may be specified by an imaging area (X, Y, Z) of the virtual camera IC, i.e., the predetermined area T, rather than the predetermined-area information, i.e., the position coordinate of the virtual camera IC. A description is given hereinafter using the position coordinate (x(rH), y(rV), and an angle of view α (angle)) of the virtual camera IC.

Figure 7:
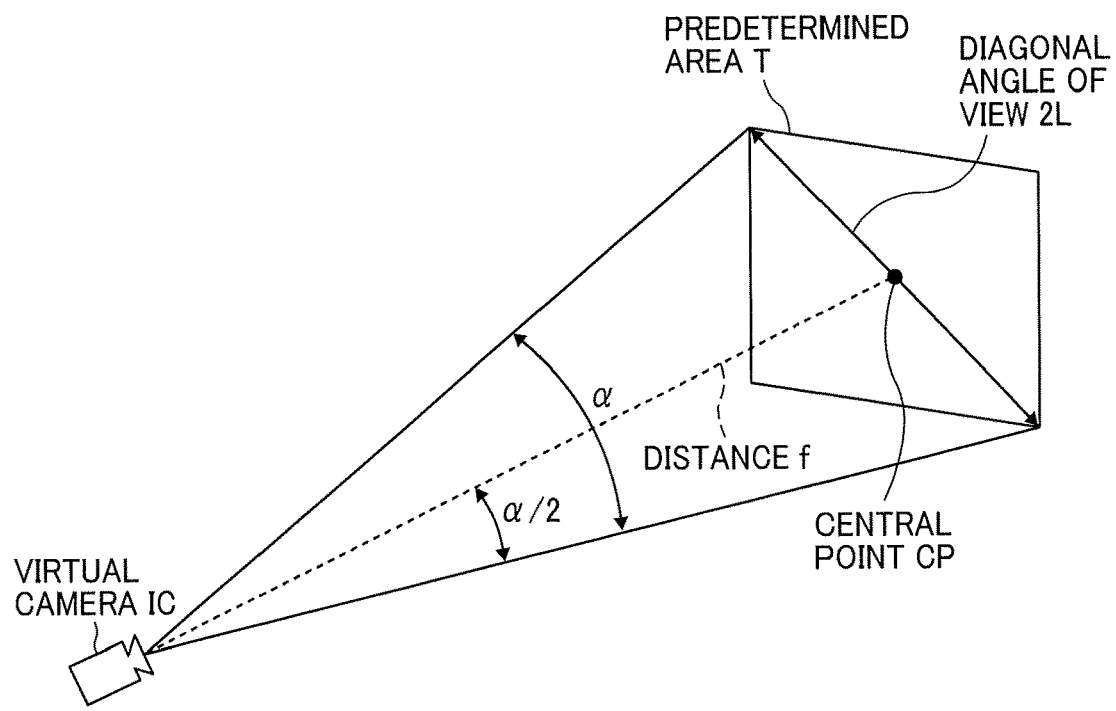
FIG. 7 is a view illustrating a relation between predetermined-area information and a predetermined-area image according to an embodiment of the present disclosure.

Hereinafter, a description is given of a relation between the predetermined-area information and the predetermined area T with reference to FIG. 7. FIG. 7 is a view illustrating a relation between the predetermined-area information and the predetermined area T. As illustrated in FIG. 7, a center point CP of 2L provides the parameters (x, y) of the predetermined-area information, where 2L denotes a diagonal angle of view of the predetermined area T specified the angle of view α of the virtual camera IC. f is the distance from the virtual camera IC to the center point CP. L is a distance between the center point CP and a given vertex of the predetermined area T (2L is a diagonal line). In FIG. 7, a trigonometric function equation generally expressed by the following equation (1) is satisfied.

$$L/f = \tan(\alpha/2) \quad \text{(Equation 1)}$$

<Overview of Image Communication System>

Figure 8:
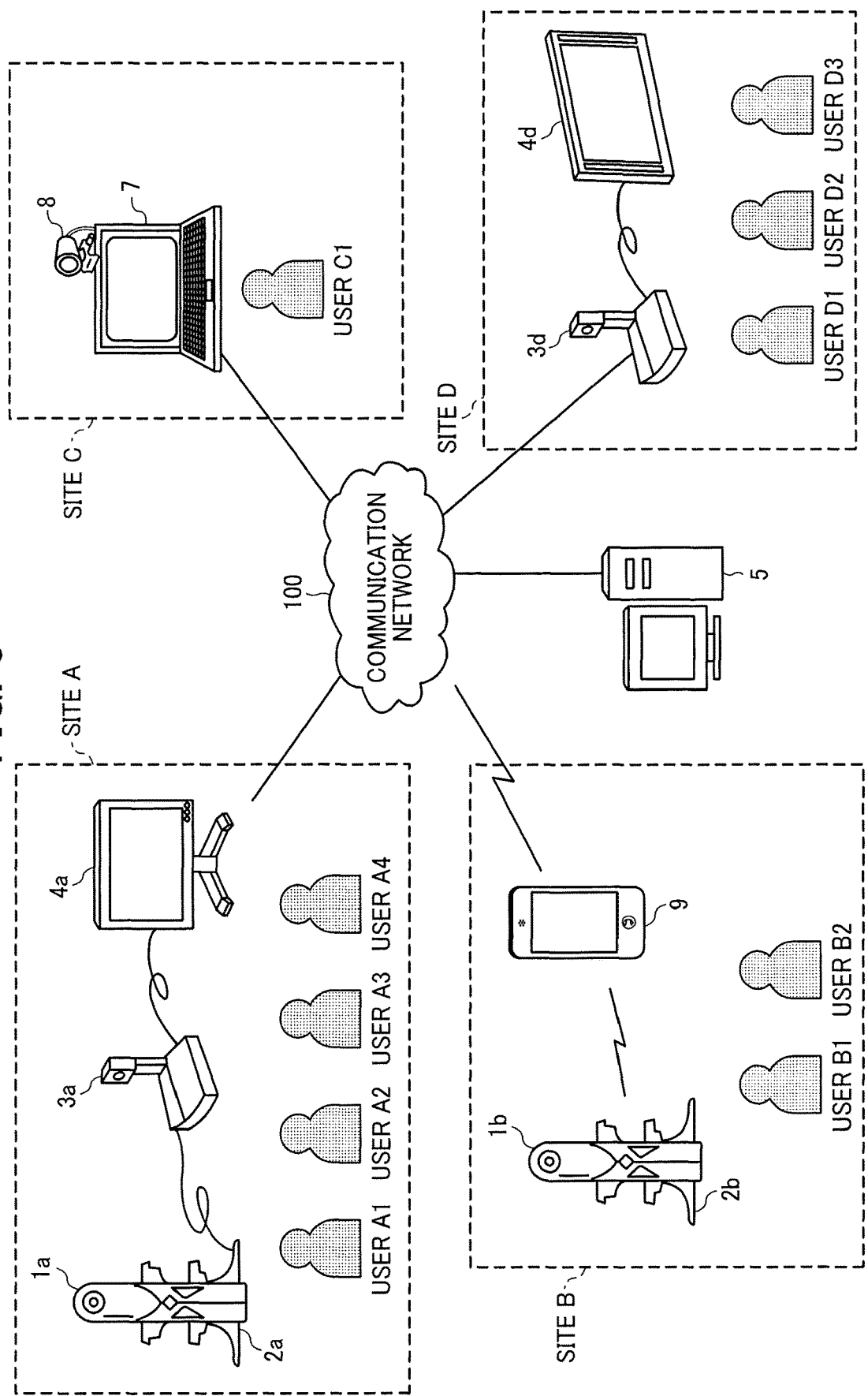
FIG. 8 is a schematic diagram illustrating a configuration of an image communication system according to an embodiment of the present disclosure.

Hereinafter, a description is given of an overview of a configuration of an image communication system according to this embodiment with reference to FIG. 8. FIG. 8 is a schematic diagram illustrating a configuration of the image communication system according to this embodiment.

As illustrated in FIG. 8, the image communication system according to this embodiment includes an image capturing device 1a, an image capturing device 1b, a videoconference terminal 3a, a videoconference terminal 3d, a display 4a, a display 4d, a communication management system 5, a personal computer (PC) 7, an image capturing device 8, and a smartphone 9. The videoconference terminal 3a, the smartphone 9, the PC 7, and the videoconference terminal 3d communicate data with one another via a communication network 100 such as the Internet. The communication network 100 may be either a wireless network or a wired network.

The image capturing device 1a and the image capturing device 1b are each a special digital camera, which captures an image of a subject or surroundings to obtain two hemispherical images, from which a full spherical panoramic image is generated, as described above. By contrast, the image capturing device 8 is a general-purpose digital camera that captures an image of a subject or surroundings to obtain a general planar image.

The videoconference terminals 3a and the videoconference terminal 3d are each a terminal dedicated to videoconferencing. The videoconference terminal 3a and the videoconference terminal 3d display an image of video calling on the displays 4a and 4d, respectively, via a wired cable such as a universal serial bus (USB). The videoconference terminal 3a usually captures an image by a camera 312, which is described later. However, in a case in which the videoconference terminal 3a is connected to a cradle 2a on which the image capturing device 1a is mounted, the image capturing device 1a is preferentially used. Accordingly, two hemispherical images are obtained, from which a full spherical panoramic image is generated. When a wired cable is used for connecting the videoconference terminal 3a and the cradle 2a, the cradle 2a not only enables communications between the image capturing device 1a and the videoconference terminal 3a but also supplies power with the image capturing device 1a and holds the image capturing device 1a. In this disclosure, the image capturing device 1a, the cradle 2a, the videoconference terminal 3a, and the display 4a are located at the same site A. In the site A, four users A1, A2, A3 and A4 are participating in video calling. On the other hand, the videoconference terminal 3d and the display 4d are located at the same site D. In the site D, three users D1, D2, and D3 are participating in video calling.

The communication management system 5 manages and controls communication of the videoconference terminal 3a, the videoconference terminal 3d, the PC 7 and the smartphone 9. Further, the communication management system 5 manages types (a general image type and a special image type) of image data exchanged. Therefore, the communication management system 5 also operates as a communication control system. In this disclosure, the special image is a full spherical panoramic image. The communication management system 5 is located, for example, at a service provider that provides video communication service. In one example, the communication management system 5 is configured as a single computer. In another example, the communication management system 5 is constituted as a plurality of computers to which divided portions (functions, means, or storages) are arbitrarily allocated. In other words, the communication management system 5 may be implemented by a plurality of servers that operate in cooperation with one another.

The PC 7 performs video calling with the image capturing device 8 connected thereto. In this disclosure, the PC 7 and the image capturing device 8 are located at the same site C. At the site C, one user C is participating in video calling.

The smartphone 9 includes a display 917, which is described later, and displays an image of video calling on the display 917. The smartphone 9 includes a complementary metal oxide semiconductor (CMOS) sensor 905, and usually captures an image with the CMOS sensor 905. In addition, the smartphone 9 is also capable of obtaining data of two hemispherical images captured by the image capturing device 1b, based on which the full spherical panoramic image is generated, by wireless communication such as Wireless Fidelity (Wi-Fi) and Bluetooth (registered trademark). In a case in which wireless communication is used for obtaining data of two hemispherical images, a cradle 2b just supplies power with the image capturing device 1b and holds the image capturing device 1b. In this disclosure, the image capturing device 1b, the cradle 2b, and the smartphone 9 are located at the same site B. Further, in the site B, two users B1 and B2 are participating in video calling.

The videoconference terminal 3a, the videoconference terminal 3d, the PC 7 and the smartphone 9 are each an example of a communication terminal. OpenGL ES is installed in each of those communication terminals to enable each communication terminal to generate predetermined-area information that indicates a partial area of a full spherical panoramic image, or to generate a predetermined-area image from a full spherical panoramic image that is transmitted from a different communication terminal.

The arrangement of the terminals, apparatuses and users illustrated in FIG. 8 is just an example, and any other suitable arrangement will suffice. For example, in the site C, an image capturing device that is capable of performing image capturing for a full spherical panoramic image may be used in place of the image capturing device 8. In addition, examples of the communication terminal include a digital television, a smartwatch, and a car navigation device. Hereinafter, any arbitrary one of the image capturing device 1a and the image capturing device 1b is referred to as "image capturing device 1". Further, any arbitrary one of the videoconference terminal 3a and the videoconference terminal 3d is referred to as "videoconference terminal 3", hereinafter. Furthermore, any arbitrary one of the display 4a and the display 4d is referred to as "display 4", hereinafter.

<Hardware Configuration According to Embodiment>

Hereinafter, a description is given of hardware configurations of the image capturing device 1, the videoconference terminal 3, the communication management system 5, the PC 7, and the smartphone 9 according to this embodiment, with reference to FIGS. 9 to 12. Since the image capturing device 8 is a general-purpose camera, a detailed description thereof is omitted.

<Hardware Configuration of Image Capturing Device 1>

Figure 9:
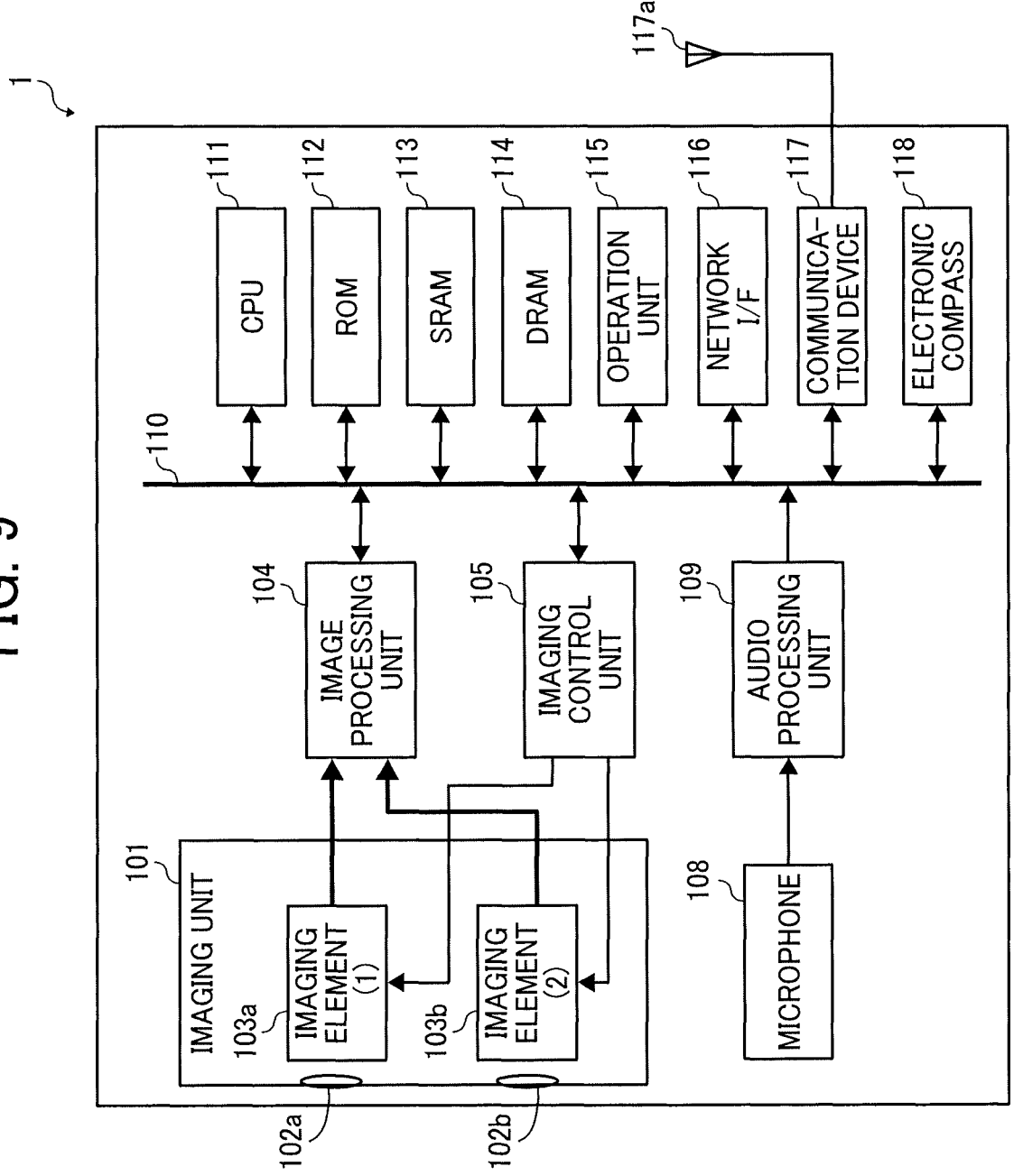
FIG. 9 is a schematic block diagram illustrating a hardware configuration of the image capturing device according to an embodiment of the present disclosure.

First, a description is given of a hardware configuration of the image capturing device 1, with reference to FIG. 9. FIG. 9 is a block diagram illustrating a hardware configuration of the image capturing device 1. A description is given hereinafter of a case in which the image capturing device 1 is a full spherical (omnidirectional) image capturing device having two imaging elements. However, the image capturing device 1 may include any suitable number of imaging elements, providing that it includes at least two imaging elements. In addition, the image capturing device 1 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the image capturing device 1.

As illustrated in FIG. 9, the image capturing device 1 includes an imaging unit 101, an image processing unit 104, an imaging control unit 105, a microphone 108, an audio processing unit 109, a central processing unit (CPU) 111, a read only memory (ROM) 112, a static random access memory (SRAM) 113, a dynamic random access memory (DRAM) 114, an operation unit 115, a network interface (I/F) 116, a communication device 117, and an antenna 117a.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an image sensor such as a CMOS sensor and a charge-coupled device (CCD) sensor, a timing generation circuit, and a group of registers. The image sensor converts an optical image formed by the fisheye lenses 102a and 102b into electric signals to output image data. The timing generation circuit generates horizontal or vertical synchronization signals, pixel clocks and the like for the image sensor. Various commands, parameters and the like for operations of the imaging elements 103a and 103b are set in the group of registers.

Each of the imaging elements 103a and 103b of the imaging unit 101 is connected to the image processing unit 104 via a parallel I/F bus. In addition, each of the imaging elements 103a and 103b of the imaging unit 101 is connected to the imaging control unit 105 via a serial I/F bus such as an I2C bus. The image processing unit 104 and the imaging control unit 105 are each connected to the CPU 111 via a bus 110. Furthermore, the ROM 112, the SRAM 113, the DRAM 114, the operation unit 115, the network I/F 116, the communication device 117, and the electronic compass 118 are also connected to the bus 110.

The image processing unit 104 acquires image data from each of the imaging elements 103a and 103b via the parallel I/F bus and performs predetermined processing on each image data. Thereafter, the image processing unit 104 combines these image data to generate data of the Mercator image as illustrated in FIG. 3C.

The imaging control unit 105 usually functions as a master device while the imaging elements 103a and 103b each usually functions as a slave device. The imaging control unit 105 sets commands and the like in the group of registers of the imaging elements 103a and 103b via the I2C bus. The imaging control unit 105 receives necessary commands from the CPU 111. Further, the imaging control unit 105 acquires status data of the group of registers of the imaging elements 103a and 103b via the I2C bus. The imaging control unit 105 sends the acquired status data to the CPU 111.

The imaging control unit 105 instructs the imaging elements 103a and 103b to output the image data at a time when the shutter button of the operation unit 115 is pressed. The image capturing device 1 may display a preview image on a display (e.g., a display of the videoconference terminal 3a) or may support displaying movie. In this case, the image data are continuously output from the imaging elements 103a and 103b at a predetermined frame rate (frames per minute).

Furthermore, the imaging control unit 105 operates in cooperation with the CPU 111 to synchronize times when the imaging elements 103a and 103b output the image data. It should be noted that although in this embodiment, the image capturing device 1 does not include a display unit (display), the image capturing device 1 may include the display.

The microphone 108 converts sounds to audio data (signal). The audio processing unit 109 acquires the audio data from the microphone 108 via an I/F bus and performs predetermined processing on the audio data.

The CPU 111 controls an entire operation of the image capturing device 1 and performs necessary processing. The ROM 112 stores various programs for the CPU 111. The SRAM 113 and the DRAM 114 each operates as a work memory to store programs loaded from the ROM 112 for execution by the CPU 111 or data in current processing. More specifically, the DRAM 114 stores image data currently processed by the image processing unit 104 and data of the Mercator image on which processing has been performed.

The operation unit 115 collectively refers to various operation keys, a power switch, the shutter button, and a touch panel having functions of both displaying information and receiving input from a user, which may be used in combination. The user operates the operation keys to input various photographing modes or photographing conditions.

The network I/F 116 collectively refers to an interface circuit such as a USB I/F that allows the image capturing device 1 to communicate data with an external media such as an SD card or an external personal computer. The network I/F 116 supports at least one of wired and wireless communications. The data of the Mercator image, which is stored in the DRAM 114, is stored in the external media via the network I/F 116 or transmitted to the external device such as the videoconference terminal 3a via the network I/F 116, as needed.

The communication device 117 communicates data with an external device such as the videoconference terminal 3a via the antenna 117a of the image capturing device 1 by near distance wireless communication such as Wi-Fi and Near Field Communication (NFC). The communication device 117 is also capable of transmitting the data of Mercator image to the external device such as the videoconference terminal 3a.

The electronic compass 118 calculates an orientation and a tilt (roll angle) of the image capturing device 1 from the Earth's magnetism to output orientation and tilt information. This orientation and tilt information is an example of related information, which is metadata described in compliance with Exif. This information is used for image processing such as image correction of captured images. Further, the related information also includes a date and time when the image is captured by the image capturing device 1, and a size of the image data.

<Hardware Configuration of Videoconference Terminal 3>

Figure 10:
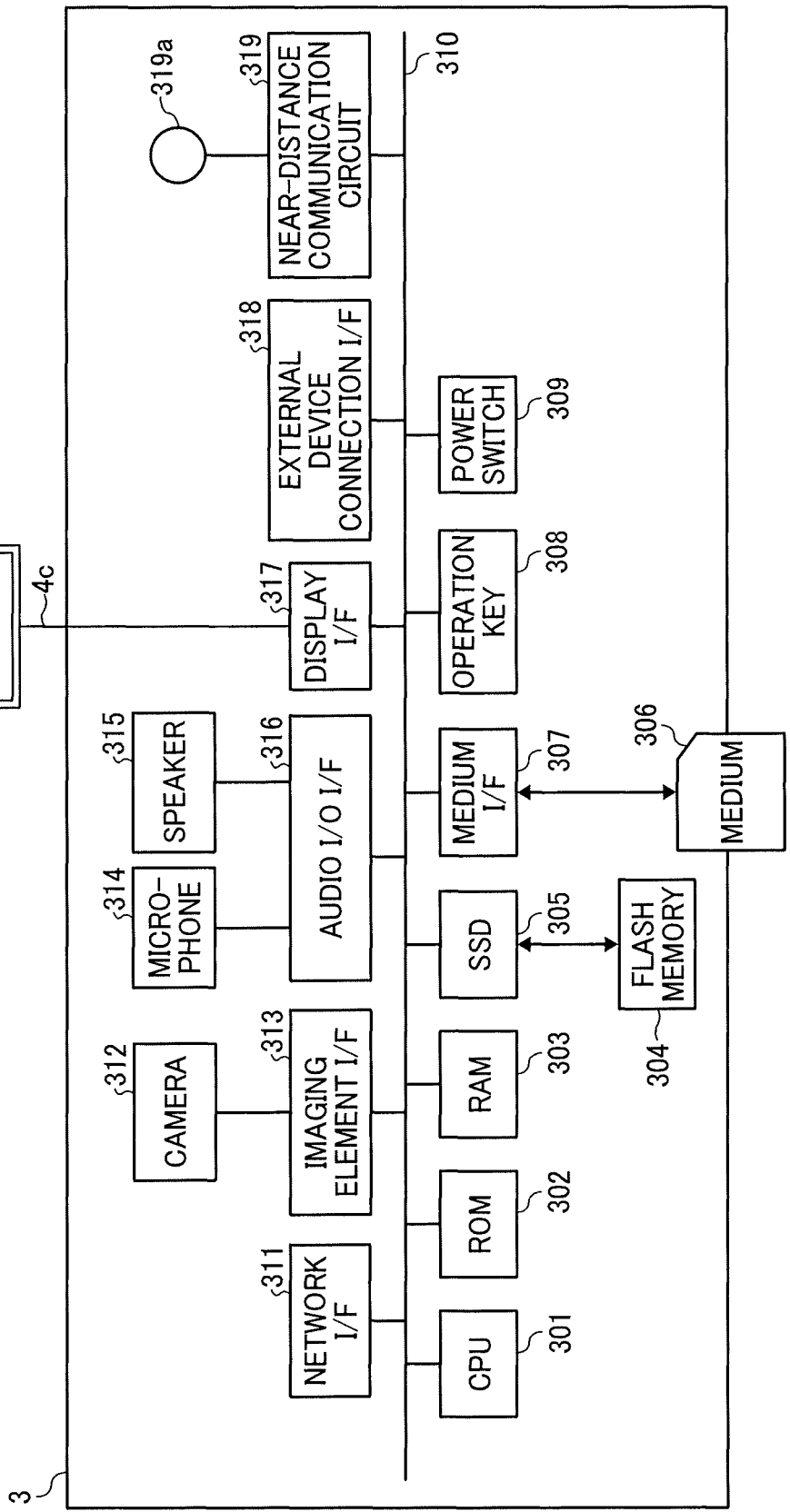
FIG. 10 is a schematic block diagram illustrating a hardware configuration of a videoconference terminal, according to an embodiment of the present disclosure.

Hereinafter, a description is given of a hardware configuration of the videoconference terminal 3 with reference to FIG. 10. FIG. 10 is a block diagram illustrating a hardware configuration of the videoconference terminal 3. As illustrated in FIG. 10, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output interface 316, a display I/F 317, an external device connection I/F 318, a near-distance communication circuit 319, and an antenna 319a for the near-distance communication circuit 319.

The CPU 301 controls an entire operation of the videoconference terminal 3. The ROM 302 stores a control program for operating the CPU 301 such as an Initial Program Loader (IPL). The RAM 303 is used as a work area for the CPU 301. The flash memory 304 stores various data such as a communication control program, image data, and audio data. The SSD 305 controls reading or writing of various data to and from the flash memory 304 under control of the CPU 301. A hard disk drive (HDD) may be used in place of the SSD 305. The medium I/F 307 controls reading or writing (storing) of data with respect to a recording medium 306 such as a flash memory. The operation key 308 is operated by a user to input a user instruction such as a user selection of a destination of the videoconference terminal 3. The power switch 309 is a switch that turns on or off the power of the videoconference terminal 3.

The network I/F 311 allows communication of data with an external device through the communication network 100 such as the Internet. The camera 312 is an example of a built-in imaging device capable of capturing a subject under control of the CPU 301 to obtain image data. The imaging element I/F 313 is a circuit that controls driving of the camera 312. The microphone 314 is an example of a built-in audio collecting device capable of inputting audio. The audio input/output interface 316 is a circuit for controlling input and output of audio signals between the microphone 314 and the speaker 315 under control of the CPU 301. The display I/F 317 is a circuit for transmitting image data to an external display 4 under control of the CPU 301. The external device connection I/F 318 is an interface circuit that connects the videoconference terminal 3 to various external devices. The near-distance communication circuit 319 is a communication circuit that communicates in compliance with the NFC (registered trademark), the Bluetooth (registered trademark) and the like.

The bus line 310 may be an address bus or a data bus, which electrically connects various elements such as the CPU 301 illustrated in FIG. 10.

The display 4 is an example of a display unit, such as a liquid crystal or organic electroluminescence (EL) display that displays an image of a subject, an operation icon, or the like. The display 4 is connected to the display I/F 317 by a cable 4c. The cable 4c may be an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes a lens and a solid-state imaging element that converts an image (video) of a subject to electronic data through photoelectric conversion. As the solid-state imaging element, for example, a CMOS sensor or a CCD sensor is used. The external device connection I/F 318 is capable of connecting an external device such as an external camera, an external microphone, or an external speaker through a USB cable or the like. In a case in which an external camera is connected, the external camera is driven in preference to the built-in camera 312 under control of the CPU 301. Similarly, in a case in which an external microphone is connected or an external speaker is connected, the external microphone or the external speaker is driven in preference to the built-in microphone 314 or the built-in speaker 315 under control of the CPU 301.

The recording medium 306 is removable from the videoconference terminal 3. In addition to the flash memory 304, any suitable nonvolatile memory, such as an electrically erasable and programmable ROM (EEPROM), may be used, provided that it reads or writes data under control of CPU 301.

<Hardware Configuration of Communication Management System 5 and PC 7>

Figure 11:
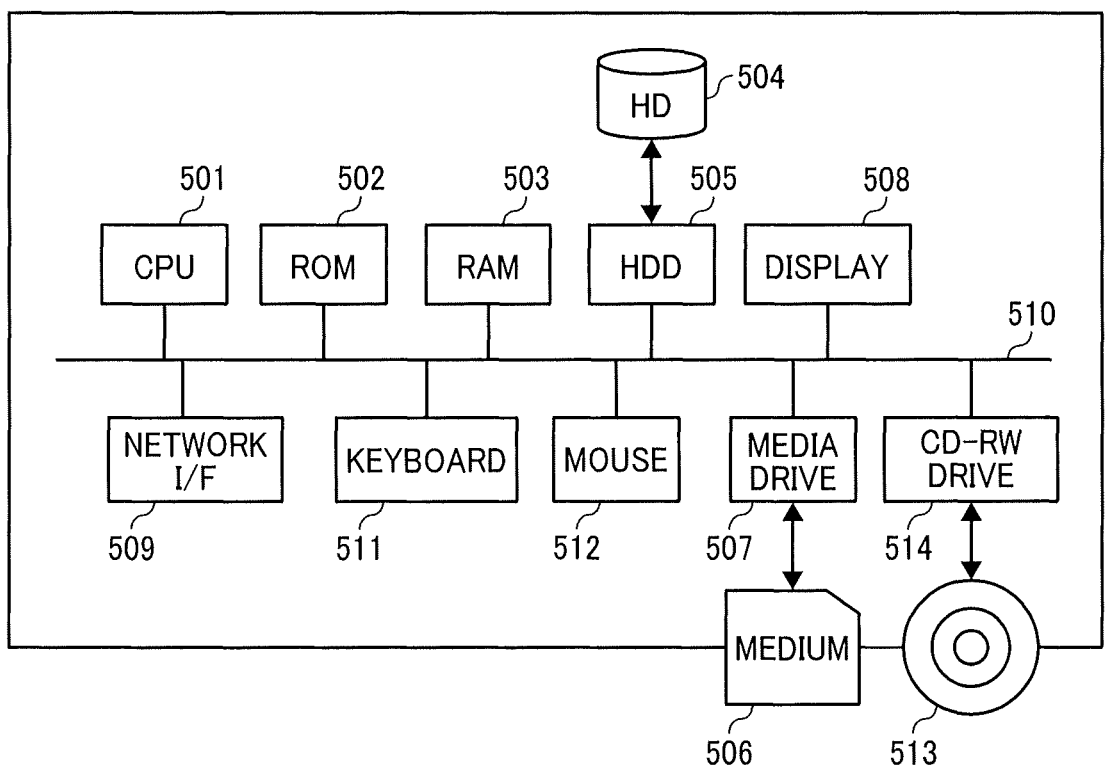
FIG. 11 is a schematic block diagram illustrating a hardware configuration of any one of a communication management system and a personal computer (PC), according to an embodiment of the present disclosure.

Hereinafter, a description is given of hardware configurations of the communication management system 5 and the PC 7, with reference to FIG. 11. FIG. 11 is a block diagram illustrating a hardware configuration of any one of the communication management system 5 and the PC 7. In this disclosure, both the communication management system 5 and the PC 7 are implemented by a computer. Therefore, a description is given of a configuration of the communication management system 5, and the description of a configuration of the PC 7 is omitted, having the same or substantially the same configuration as that of the communication management system 5.

The communication management system 5 includes a CPU 501, a ROM 502, a RAM 503, an HD 504, a hard disc drive (HDD) 505, a media drive 507, a display 508, a network I/F 509, a keyboard 511, a mouse 512, a compact disc rewritable (CD-RW) drive 514, and a bus line 510. The CPU 501 controls entire operation of the communication management system 5. The ROM 502 stores programs such as an IPL to boot the CPU 501. The RAM 503 is used as a work area for the CPU 501. The HD 504 stores various data such as programs for the communication management system 5. The HDD 505 controls reading and writing of data from and to the HD 504 under control of the CPU 501. The media drive 507 controls reading and writing (storing) of data from and to a recording medium 506 such as a flash memory. The display 508 displays various information such as a cursor, menus, windows, characters, or images. The network I/F 509 enables communication of data with an external device through the communication network 100.

The keyboard 511 includes a plurality of keys to allow a user to input characters, numbers, and various instructions. The mouse 512 allows a user to input an instruction for selecting and executing various functions, selecting an item to be processed, or moving the cursor. The CD-RW drive 514 controls reading or writing of data from or to a removable recording medium 513 such as a CD-RW or CD-ROM. The bus line 510 electrically connects those parts or devices of the communication management system 5 to each other as illustrated in FIG. 11. Examples of the bus line 510 include an address bus and a data bus.

<Hardware Configuration of Smartphone 9>

Figure 12:
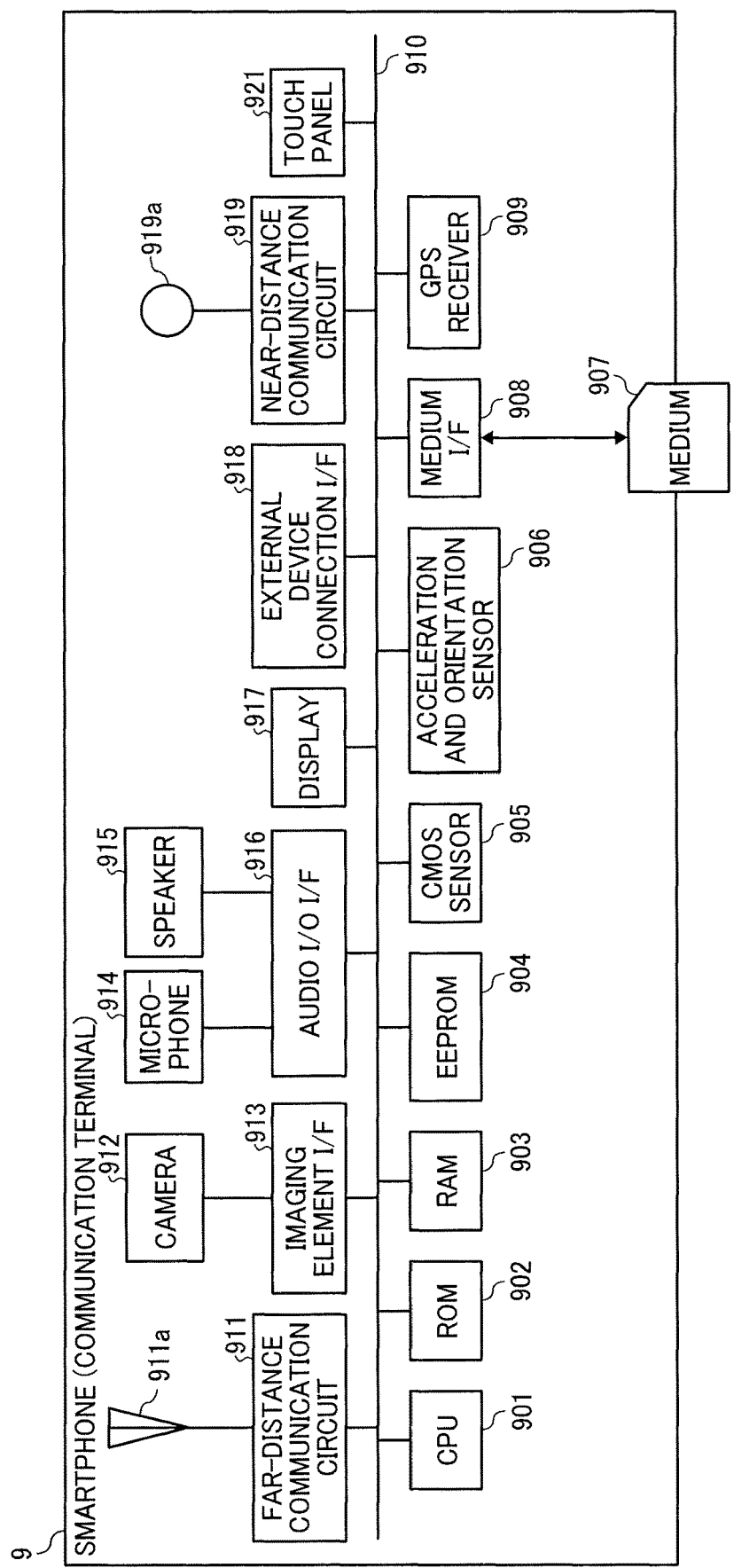
FIG. 12 is a schematic block diagram illustrating a hardware configuration of a smartphone, according to an embodiment of the present disclosure.

Hereinafter, a description is given of hardware of the smartphone 9 with reference to FIG. 12. FIG. 12 is a block diagram illustrating a hardware configuration of the smartphone 9. As illustrated in FIG. 12, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls an entire operation of the smartphone 9. The ROM 902 stores programs such as an IPL to boot the CPU 901. The RAM 903 is used as a work area for the CPU 901. The EEPROM 904 reads or writes various data such as a control program for the smartphone 9 under control of the CPU 901. The CMOS sensor 905 captures an object (mainly, a user operating the smartphone 9) under control of the CPU 901 to obtain image data. The acceleration and orientation sensor 906 includes various sensors such as an electromagnetic compass for detecting geomagnetism, a gyrocompass, or an acceleration sensor. The medium I/F 908 controls reading or writing of data with respect to a recording medium 907 such as a flash memory. The GPS receiver 909 receives a GPS signal from a GPS satellite.

The smartphone 9 further includes a far-distance communication circuit 911, a camera 912, an imaging element I/F 913, a microphone 914, a speaker 915, an audio input/output interface 916, a display 917, an external device connection I/F 918, a near-distance communication circuit 919, an antenna 919a for the near-distance communication circuit 919, and a touch panel 921.

The far-distance communication circuit 911 is a circuit that communicates with other device through the communication network 100. The camera 912 is an example of a built-in imaging device capable of capturing a subject under control of the CPU 901 to obtain image data. The imaging element I/F 913 is a circuit that controls driving of the camera 912. The microphone 914 is an example of a built-in audio collecting device capable of inputting audio. The audio input/output interface 916 is a circuit for controlling input and output of audio signals between the microphone 914 and the speaker 915 under control of the CPU 901. The display 917 is an example of a display unit, such as a liquid crystal or organic electroluminescence (EL) display that displays an image of a subject, an operation icon, or the like. The external device connection I/F 918 is an interface circuit that connects the smartphone 9 to various external devices. The near-distance communication circuit 919 is a communication circuit that communicates in compliance with the NFC, the Bluetooth and the like. The touch panel 921 is an example of an input device to operate a smartphone 9 by touching a screen of the display 917.

The smartphone 9 further includes a bus line 910. Examples of the bus line 910 include an address bus and a data bus, which electrically connects the elements such as the CPU 901.

It should be noted that a recording medium such as a CD-ROM or a hard disk storing any one of the above-described programs may be distributed domestically or overseas as a program product.

<Functional Configuration According to Embodiment>

Figure 13:
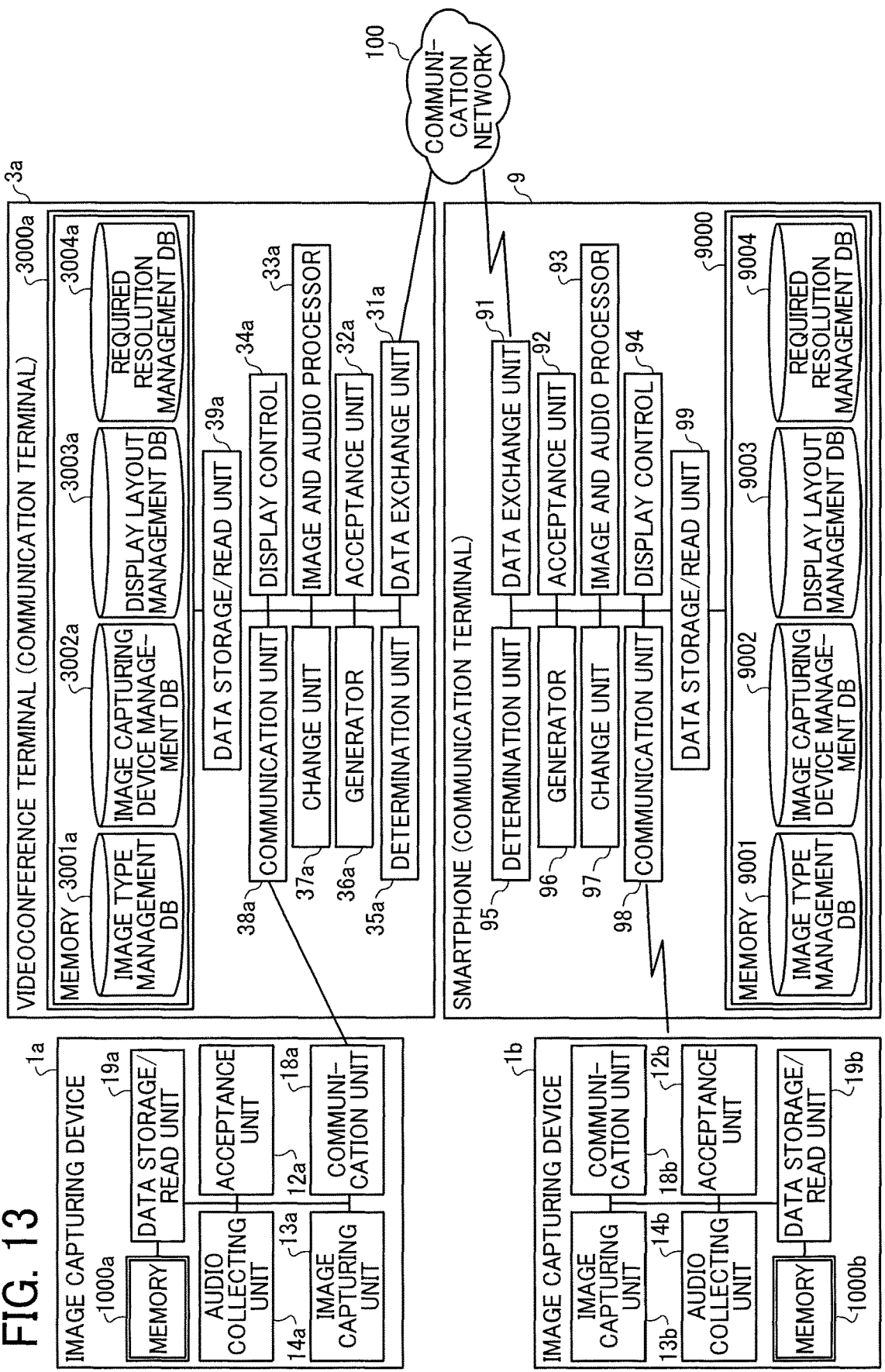
FIG. 13 is a schematic block diagram illustrating a part of a functional configuration of the image communication system according to an embodiment of the present disclosure.
Figure 14:
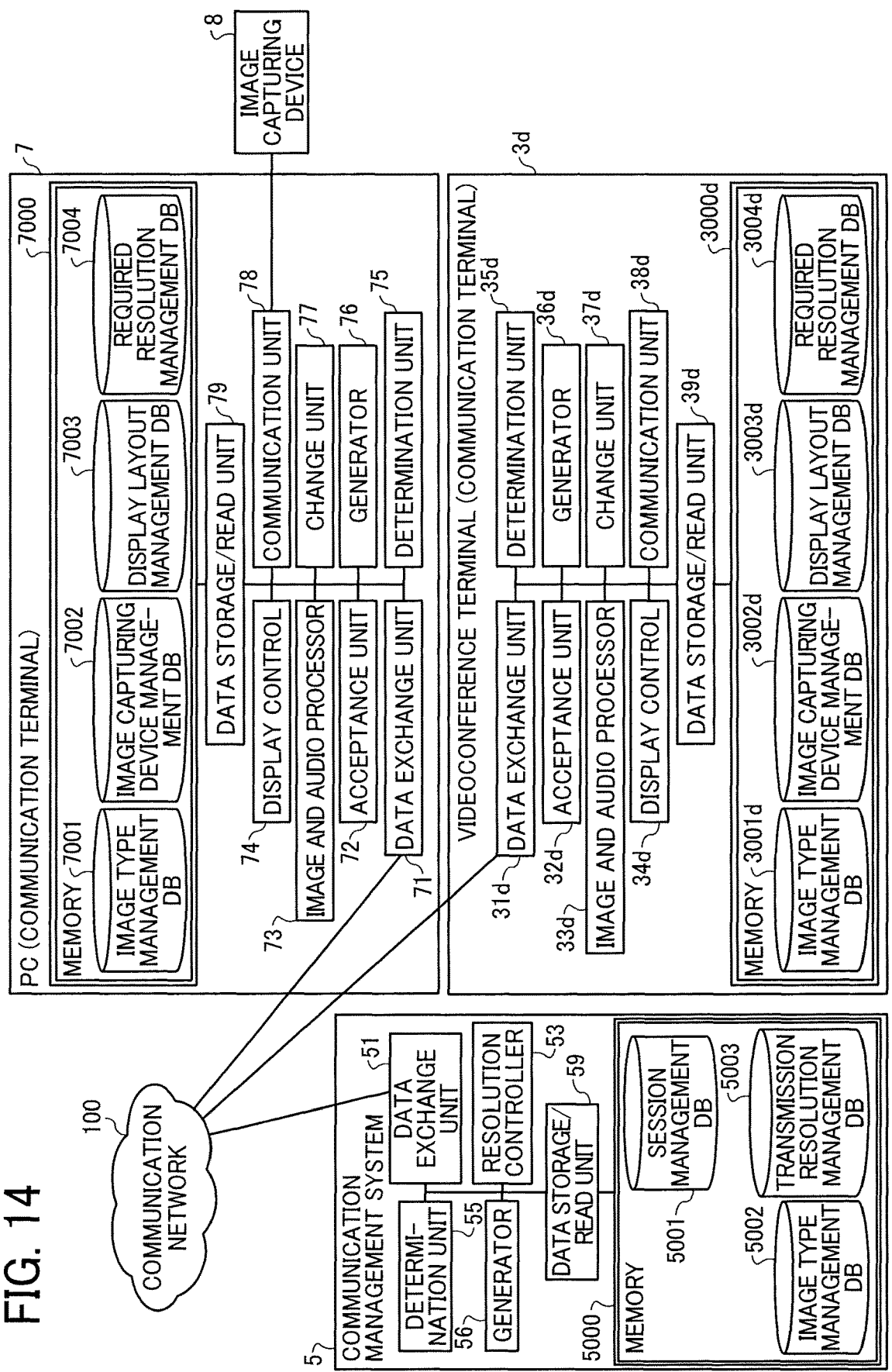
FIG. 14 is a schematic block diagram illustrating a part of a functional configuration of the image communication system according to an embodiment of the present disclosure.

Hereinafter, a description is given of a functional configuration of the image communication system according to this embodiment, with reference to FIG. 13 to FIG. 21. FIG. 13 and FIG. 14 are block diagrams, each illustrating a part of a functional configuration of the image communication system.

<Functional Configuration of Image Capturing Device 1a>

As illustrated in FIG. 13, the image capturing device 1a includes an acceptance unit 12a, an image capturing unit 13a, an audio collecting unit 14a, a communication unit 18a, and a data storage/read unit 19a. These units are functions or means that are implemented by or that are caused to function by operating any of the elements illustrated in FIG. 9 in cooperation with the instructions of the CPU 111 according to the image capturing device control program expanded from the SRAM 113 to the DRAM 114.

The image capturing device 1a further includes a memory 1000a, which is implemented by the ROM 112, the SRAM 113, and the DRAM 114 illustrated in FIG. 9. The memory 1000a stores therein a globally unique identifier (GUID) identifying the own device (i.e., the image capturing device 1a).

The image capturing device 1b includes an acceptance unit 12b, an image capturing unit 13b, an audio collecting unit 14b, a communication unit 18b, a data storage/read unit 19b, and a memory 1000b. These functional units of the image capturing device 1b implement the similar or substantially the similar functions as those of the acceptance unit 12a, the image capturing unit 13a, the audio collecting unit 14a, the communication unit 18a, the data storage/read unit 19a, and the memory 1000 of the image capturing device 1a, respectively. Therefore, redundant descriptions thereof are omitted below.

(Each Functional Unit of Image Capturing Device 1a)

Hereinafter, referring to FIG. 9 and FIG. 13, a further detailed description is given of each functional unit of the image capturing device 1a according to the embodiment.

The acceptance unit 12a of the image capturing device 1a is implemented by the operation unit 115 illustrated in FIG. 9, when operating under control of the CPU 111. The acceptance unit 12a receives an instruction input from the operation unit 115 according to a user operation.

The image capturing unit 13a is implemented by the imaging unit 101, the image processing unit 104, and the imaging control unit 105, illustrated in FIG. 9, when operating under control of the CPU 111. The image capturing unit 13a captures an image of a subject or surroundings to obtain captured-image data.

The audio collecting unit 14a is implemented by the microphone 108 and the audio processing unit 109 illustrated in FIG. 9, when operating under control of the CPU 111. The audio collecting unit 14a collects sounds around the image capturing device 1a.

The communication unit 18a, which is implemented by instructions of the CPU 111, communicates data with a communication unit 38 of the videoconference terminal 3a using the near-distance wireless communication technology in compliance with such as NFC, Bluetooth, or Wi-Fi.

The data storage/read unit 19a, which is implemented by instructions of the CPU 111 illustrated in FIG. 9, stores data or information in the memory 1000a or reads out data or information from the memory 1000a.

<Functional Configuration of Videoconference Terminal 3a>

As illustrated in FIG. 13, the videoconference terminal 3a includes a data exchange unit 31a, an acceptance unit 32a, an image and audio processor 33a, a display control 34a, a determination unit 35a, a generator 36a, a change unit 37a, a communication unit 38a, and a data storage/read unit 39a. These units are functions that are implemented by or that are caused to function by operating any of the elements illustrated in FIG. 10 in cooperation with the instructions of the CPU 301 according to the control program for the videoconference terminal 3a, expanded from the flash memory 304 to the RAM 303.

The videoconference terminal 3a further includes a memory 3000a, which is implemented by the ROM 302, the RAM 303, and the flash memory 304 illustrated in FIG. 10. The memory 3000a stores an image type management DB 3001a, an image capturing device management DB 3002a, a display layout management DB 3003a, and a required resolution management DB 3004a. Among these DBs, the image type management DB 3001a is implemented by an image type management table illustrated in FIG. 15. The image capturing device management DB 3002a is implemented by an image capturing device management table illustrated in FIG. 16. The display layout management DB 3003a is implemented by a display layout management table illustrated in FIG. 17A. The required resolution management DB 3004a is implemented by required resolution management tables illustrated in FIGS. 18A and 18B.

The videoconference terminal 3d includes a data exchange unit 31d, an acceptance unit 32d, an image and audio processor 33d, a display control 34d, a determination unit 35d, a generator 36d, a change unit 37d, a communication unit 38d, and a data storage/read unit 39d, and a memory 3000d. These functional units of the videoconference terminal 3d implement the similar or substantially the similar functions as those of the data exchange unit 31a, the acceptance unit 32a, the image and audio processor 33a, the display control 34a, the determination unit 35a, the generator 36a, the change unit 37a, the communication unit 38a, the data storage/read unit 39a, and the memory 3000a of the videoconference terminal 3a, respectively. Therefore, redundant descriptions thereof are omitted below. In addition, the memory 3000d of the videoconference terminal 3d stores an image type management DB 3001d, and an image capturing device management DB 3002d, a display layout management DB 3003d, and a required resolution management DB 3004d. These DBs 3001d, 3002d, 3003d and 3004d have the same or the substantially the same data structure as the image type management DB 3001a, the image capturing device management DB 3002a, the display layout management DB 3003a, and the required resolution management DB 3004a of the videoconference terminal 3a, respectively. Therefore, redundant descriptions thereof are omitted below.

(Image Type Management Table)

FIG. 15 is a conceptual diagram illustrating the image type management table according to an embodiment of this disclosure. The image type management table stores an image data identifier (ID), an IP address, which is an example of an address of a sender terminal and a source name, in association with one another. The image data ID is one example of image data identification information for identifying image data to be used in video communication. An identical image data ID is assigned to image data transmitted from the same sender terminal. Accordingly, a destination terminal (that is, a communication terminal that receives image data) can identify a sender terminal from which the image data is received. The IP address of the sender terminal, which is associated with specific image data ID, is an IP address of a communication terminal that transmits image data identified by that image data ID associated with the IP address. The source name, which is associated with specific image data ID, is a name for identifying an image capturing device that outputs the image data identified by that image data ID associated with the source name. The source name is one example of image type information. This source name is generated by a communication terminal such as the videoconference terminal 3a according to a predetermined naming rule.

The example of the image type management table illustrated in FIG. 15 indicates that four communication terminals, whose IP addresses are respectively "1.2.1.3", "1.2.2.3", "1.3.1.3", and "1.3.2.3" transmit image data identified by the image data ID "RS001", "RS002", "RS003", and "RS004", respectively. Further, according to the image type management table illustrated in FIG. 15, the image types represented by the source names of those four communication terminals are "Video_Theta", "Video_Theta", "Video", and "Video", which indicate that the image types are the special image, special image, general image, and general image, respectively. In this disclosure, the special image is a full spherical panoramic image, and the general image is a planar image.

In another example, information regarding data other than the image data may be stored in the image type management table in association with the image data ID. Examples of the data other than the image data include audio data and presentation material data shared on a screen, for example, in video communication in which the image is shared. Further, information regarding data other than the image data may be stored in the image type management table in association with the image data ID. Examples of the data other than the image data include audio data and presentation material data shared on a screen, for example, in video communication in which the image is shared.

(Image Capturing Device Management Table)

FIG. 16 is a conceptual diagram illustrating the image capturing device management table according to an embodiment of this disclosure. The image capturing device management table stores a vendor ID and a product ID from among the GUIDs of an image capturing device that is capable of obtaining two hemispherical images, from which a full spherical panoramic image is generated. As the GUID, a combination of a vendor ID (VID) and a product ID (PID) used in a USB device is used, for example. Those vendor ID and product ID are stored in a communication terminal such as a videoconference terminal before shipment. In another example, those IDs are added and stored in the videoconference terminal after shipment.

(Display Layout Management Table)

FIGS. 17A, 17B, 17C and 17D are conceptual diagrams, each illustrating the display layout management table. FIG. 17A illustrates a data structure of the display layout management DB 3003a stored in the memory 3000a in the videoconference terminal 3a.

FIG. 17B illustrates a data structure of a display layout management DB 9003 stored in the memory 9000 of the smartphone 9. FIG. 17C illustrates a data structure of a display layout management DB 7003 stored in the memory 7000 of the PC 7. FIG. 17D illustrates a data structure of the display layout management DB 3003d stored in the memory 3000d of the videoconference terminal 3d.

Figure 28B:
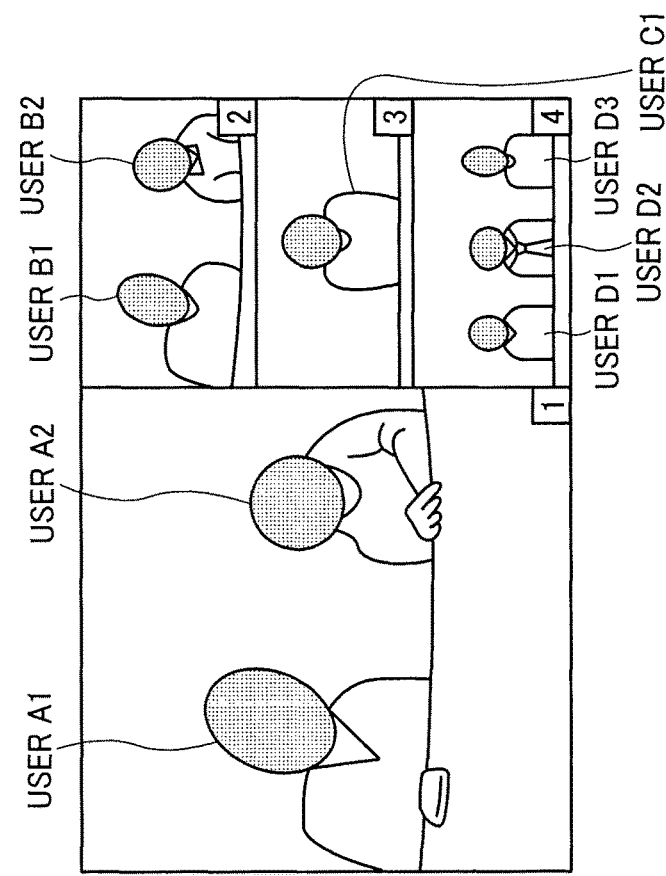
FIG. 28B is a view illustrating an example of a content displayed in a case in which a full spherical panoramic image and a predetermined-area image are generated based on image data transmitted from the image capturing device of FIGS. 1A to 1C, according to an embodiment of the present disclosure.
Figure 28A:
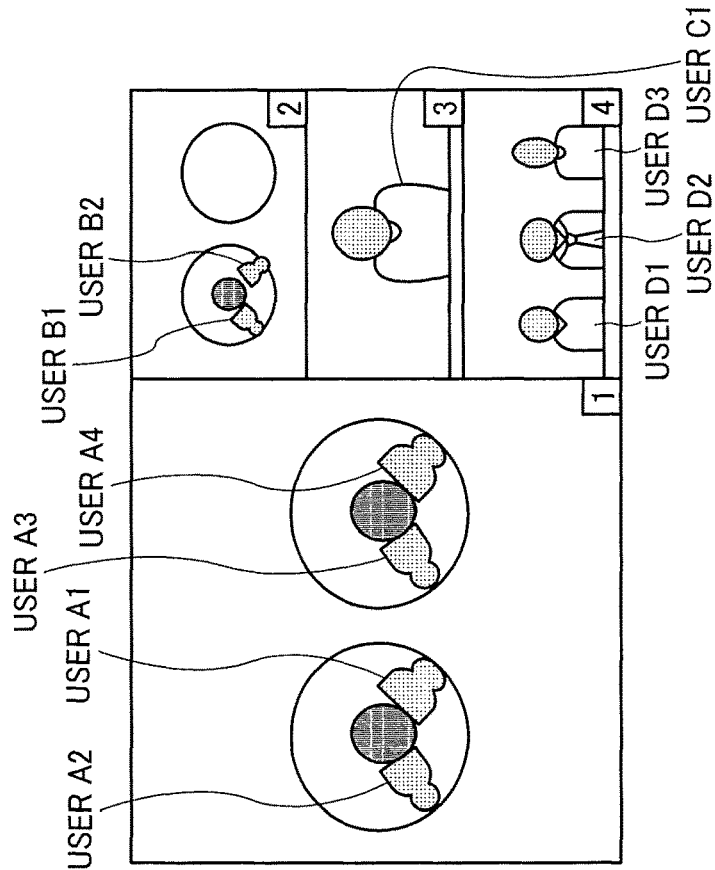
FIG. 28A is a view illustrating an example of a content displayed in a case in which image data transmitted from the image capturing device of FIGS. 1A to 1C is displayed as it is, that is, without generating a full spherical panoramic image and a predetermined-area image, according to an embodiment of the present disclosure.

The display layout management table illustrated in FIG. 17A stores, for each layout number indicating a layout of the plurality of display areas on the display 4a, an image data ID for identifying image data of an image to be displayed in the display area according to the layout, and a display size (number of pixels in horizontal and vertical directions) of the display area. The layout number in this table specifies one of a plurality of display areas in which the image data is to be displayed. More specifically, the layout number in this example corresponds to a number indicated at the lower right corner of each display area as illustrated in FIGS. 28A and 28B. The display size is information acquired from the display 4a by the videoconference terminal 3a. Accordingly, when the display 4a to be used is changed, the display size in the display layout management table is also changed. In addition, when images to be displayed in the display areas are changed (switched), the image data IDs in the display layout management table are also changed (switched). For example, in FIG. 28B, when the user B1 starts to speak, an image of the site B that was displayed in a display area "2" is switched to be displayed in a display area "1", and an image of the site A that was displayed in the display area "1" is switched to be displayed in the display area "2". This change is performed by the change unit 37a based on audio data and the image data ID.

(Required Resolution Management Table)

FIGS. 18A and 18B are conceptual diagrams illustrating the required resolution management tables for the different image types. The required resolution management tables of FIGS. 18A and 18B store, for respective ones of image type information indicating the different image types, the display size (number of pixels in horizontal and vertical directions) of each of the plurality of display areas of the display, in association with a required resolution (number of pixels in the horizontal and vertical directions) of image data to be requested for the communication management system 5. FIG. 18A is an example of the required resolution management table for the special image as the image type information. FIG. 18B illustrates an example of the required resolution management table for the general image as the image type information. As seen from FIGS. 18A and 18B, for the same display size (for example, 640×480 pixels), the required resolution (640×480 pixels) for the special image is higher than the required resolution (1280×720 pixels) for the general image. This prevents the resolution of an image representing one site displayed on a display of another site from getting extremely low, even when the image displayed on the other site is a predetermined-area image as illustrated in FIG. 6B, which is an image of a predetermined area T as a partial area of the full spherical panoramic image, as illustrated in FIG. 6A. Accordingly, the predetermined-area image is made suitable for viewing.

(Each Functional Unit of Videoconference Terminal 3a)

Hereinafter, referring to FIG. 10 and FIG. 13, a further detailed description is given of each functional unit of the videoconference terminal 3a.

The data exchange unit 31a of the videoconference terminal 3a is implemented by the network I/F 311 illustrated in FIG. 10, when operating under control of the CPU 301. The data exchange unit 31a exchanges data or information with communication management system 5 via the communication network 100.

The acceptance unit 32a is implemented by the operation key 308, when operating under control of the CPU 301. The acceptance unit 32a receives selections or inputs from a user. An input device such as a touch panel may be used as an alternative to or in place of the operation key 308.

The image and audio processor 33a, which is implemented by instructions of the CPU 301 illustrated in FIG. 10, processes image data that is obtained by capturing a subject by the camera 312. In addition, after the audio of the user is converted to an audio signal by the microphone 314, the image and audio processor 33a processes audio data according to this audio signal.

Further, the image and audio processor 33a processes image data received from other communication terminal based on the image type information such as the source name, to enable the display control 34 to control the display 4 to display an image based on the processed image data. More specifically, when the image type information indicates a special image, the image and audio processor 33a converts the image data such as hemispherical image data as illustrated in FIGS. 3A and 3B into full spherical image data to generate full spherical panoramic image data as illustrated in FIG. 4B, and further generates a predetermined-area image as illustrated in FIG. 6B. Furthermore, the image and audio processor 33a outputs, to the speaker 315, an audio signal according to audio data that is received from the other communication terminal via the communication management system 5. The speaker 315 outputs audio based on the audio signal.

The display control 34a is implemented by the display I/F 317, when operating under control of the CPU 301. The display control 34a controls the display 4 to display images or characters.

The determination unit 35a, which is implemented by instructions of the CPU 301, determines an image type according to the image data received from such as the image capturing device 1a.

The generator 36a is implemented by instructions of the CPU 301. The generator 36a generates a source name, which is one example of the image type information, according to the above-described naming rule, based on a determination result generated by the determination unit 35a indicating a general image or a special image (that is, full spherical panoramic image in this disclosure). For example, when the determination unit 35a determines the image type as a general image, the generator 36a generates the source name "Video" indicating a general image. By contrast, when the determination unit 35a determines the image type as a special image, the generator 36a generates the source name "Video_Theta" indicating a special image.

The change unit 37a, which is implemented by instruction of the CPU 301, changes (switches) the image data IDs associated with the layout numbers in the display layout management table. More specifically, the change unit 37a changes association of a layout number with an image data ID, such that the image data ID transmitted from the site where a user who spoke immediately before is present is associated with the layout number "1". At the same time, the change unit 37a associates the image data ID that was associated with the layout number "1" before this change with a layout number that was associated with the image data ID transmitted from the site where the user who spoke immediately before is present. With this process by the change unit 37a, an image according to image data from a site where a user who spoke immediately before is present is constantly displayed the largest, as illustrated in FIG. 28B.

The communication unit 38a is implemented by the near-distance communication circuit 319 and the antenna 319a, when operating under control of the CPU 301. The communication unit 38a communicates with the communication unit 18a of the image capturing device 1a using the near-distance communication technology in compliance with such as NFC, Bluetooth, or Wi-Fi. Although in the above description the communication unit 38a and the data exchange unit 31a have separate communication units, alternatively a shared communication unit may be used.

The data storage/read unit 39a, which is implemented by instructions of the CPU 301 illustrated in FIG. 10, stores data or information in the memory 3000 or reads out data or information from the memory 3000.

<Functional Configuration of Communication Management System 5>

Hereinafter, referring to FIG. 11 and FIG. 14, a detailed description is given of each functional unit of the communication management system 5. The communication management system 5 includes a data exchange unit 51, a resolution controller 53, a determination unit 55, a generator 56, and a data storage/read unit 59. These units are functions that are implemented by or that are caused to function by operating any of the elements illustrated in FIG. 11 in cooperation with the instructions of the CPU 501 according to the control program for the communication management system 5, expanded from the HD 504 to the RAM 503.

The communication management system 5 further includes a memory 5000, which is implemented by the RAM 503 and the HD 504 illustrated in FIG. 11. The memory 5000 stores a session management DB 5001, an image type management DB 5002, and a transmission resolution management DB 5003. The session management DB 5001 is implemented by a session management table illustrated in FIG. 19. The image type management DB 5002 is implemented by an image type management table illustrated in FIG. 20. The transmission resolution management DB 5003 is implemented by a transmission resolution management table illustrated in FIG. 21.

(Session Management Table)

FIG. 19 is a conceptual diagram illustrating the session management table according to an embodiment of this disclosure. The session management table stores a session ID and an IP address of participating communication terminal, in association with each other. The session ID is one example of session identification information for identifying a session that implements video calling. The session ID is generated for each virtual conference room. The session ID is also stored in each communication terminal such as the videoconference terminal 3a. Each communication terminal selects a desired session ID from the session ID or IDs stored therein. The IP address of participating communication terminal indicates an IP address of the communication terminal participating in a virtual conference room identified by the associated session ID.

(Image Type Management Table)

FIG. 20 is a conceptual diagram illustrating the image type management table according to an embodiment of this disclosure. The image type management table illustrated in FIG. 20 stores, in addition to the information items stored in the image type management table illustrated in FIG. 15, the same session ID as the session ID stored in the session management table, in association with one another. The example of the image type management table illustrated in FIG. 20 indicates that three communication terminals whose IP addresses are respectively "1.2.1.3", "1.2.2.3", and "1.3.1.3" are participating in the virtual conference room identified by the session ID "se101". The communication management system 5 stores the same image data ID, IP address of the sender terminal, and image type information as those stored in a communication terminal such as the videoconference terminal 3a in order to transmit such information as the image type information to both a communication terminal that is already in video calling and a newly participating communication terminal that enters the virtual conference room after the video calling has started. Accordingly, the communication terminal that is already in the video calling and the newly participating communication terminal do not have to exchange such information as the image type information with each other.

(Transmission Resolution Management Table)

FIG. 21 is a conceptual diagram illustrating the transmission resolution management table according to an embodiment of this disclosure. The transmission resolution management table stores an IP address of a destination (a required resolution sender terminal) to which image data is to be transmitted in a column direction in association with an IP address of an image data sender terminal from which image data is received in a row direction. Based on this table, when relaying image data received from the site A (videoconference terminal 3a) to the site D (videoconference terminal 3d) for example, the communication management system 5 transmits the image data having the resolution of 1280×720 pixels to the site D.

(Each Functional Unit of Communication Management System 5)

Hereinafter, referring to FIG. 11 and FIG. 13, a detailed description is given of each functional unit of the communication management system 5.

The data exchange unit 51 of the communication management system 5 is implemented by the network I/F 509 illustrated in FIG. 11, when operating under control of the CPU 501. The data exchange unit 51 exchanges data or information with the videoconference terminal 3a, the videoconference terminal 3d, or the PC 7 via the communication network 100.

The resolution controller 53, which is implemented by instructions of the CPU 501, controls (for example, changes) the resolution of image data transmitted from one communication terminal, based on the transmission resolution management DB 5003.

The determination unit 55, which is implemented by instructions of the CPU 501, performs various determinations.

The generator 56, which is implemented by instructions of the CPU 501, generates the image data ID.

The data storage/read unit 59 is implemented by the HDD 505 illustrated in FIG. 11, when operating under control of the CPU 501. The data storage/read unit 59 stores data or information in the memory 5000 or reads out data or information from the memory 5000.

<Functional Configuration of PC 7>

Hereinafter, referring to FIG. 11 and FIG. 13, a detailed description is given of a functional configuration of the PC 7. The PC 7 has the same or substantially the same functions as those of the videoconference terminal 3a. In other words, as illustrated in FIG. 13, the PC 7 includes a data exchange unit 71, an acceptance unit 72, an image and audio processor 73, a display control 74, a determination unit 75, a generator 76, a change unit 77, a communication unit 78, and a data storage/read unit 79. These units are functions that are implemented by or that are caused to function by operating any of the hardware elements illustrated in FIG. 11 in cooperation with the instructions of the CPU 501 according to the control program for the PC 7, expanded from the HD 504 to the RAM 503.

The PC 7 further includes a memory 7000, which is implemented by the ROM 502, the RAM 503 and the HD 504 illustrated in FIG. 11. The memory 7000 stores an image type management DB 7001, an image capturing device management DB 7002, a display layout management DB 7003, and a required resolution management DB 7004. These DBs 7001, 7002, 7003 and 7004 have the same or the substantially the same data structure as the image type management DB 3001a, the image capturing device management DB 3002a, the display layout management DB 3003a, and the required resolution management DB 3004a of the videoconference terminal 3a, respectively. Therefore, redundant descriptions thereof are omitted below.

(Each Functional Unit of PC 7)

The data exchange unit 71 of the PC 7, which is implemented by the network I/F 509, when operating under control of the CPU 501 illustrated in FIG. 11, implements the similar or substantially the similar function to that of the data exchange unit 31a.

The acceptance unit 72, which is implemented by the keyboard 511 and the mouse 512, when operating under control of the CPU 501, implements the similar or substantially the similar function to that of the acceptance unit 32a. The image and audio processor 73, which is implemented by instructions of the CPU 501, implements the similar or substantially the similar function to that of the image and audio processor 33a. The display control 74, which is implemented by instructions of the CPU 501, implements the similar or substantially the similar function to that of the display control 34a. The determination unit 75, which is implemented by instructions of the CPU 501, implements the similar or substantially the similar function to that of the determination unit 35a. The generator 76, which is implemented by instructions of the CPU 501, implements the similar or substantially the similar function to that of the generator 36a. The change unit 77, which is implemented by instructions of the CPU 501, implements the similar or substantially the similar function to that of the change unit 37a. The communication unit 78, which is implemented by instructions of the CPU 501, implements the similar or substantially the similar function to that of the communication unit 38a. The data storage/read unit 79, which is implemented by instructions of the CPU 501, stores data or information in the memory 7000 or reads out data or information from the memory 7000.

<Functional Configuration of Smartphone 9>

Hereinafter, referring to FIG. 12 and FIG. 13, a detailed description is given of a functional configuration of the smartphone 9. The smartphone 9 has the same or substantially the same functions as those of the videoconference terminal 3a. In other words, as illustrated in FIG. 13, the smartphone 9 includes a data exchange unit 91, an acceptance unit 92, an image and audio processor 93, a display control 94, a determination unit 95, a generator 96, a change unit 97, a communication unit 98, and a data storage/read unit 99. These units are functions that are implemented by or that are caused to function by operating any of the hardware elements illustrated in FIG. 12 in cooperation with the instructions of the CPU 901 according to the control program for the smartphone 9 expanded from the EEPROM 904 to the RAM 903.

The smartphone 9 further includes a memory 9000, which is implemented by the ROM 902, the RAM 903, and the EEPROM 904 illustrated in FIG. 12. The memory 9000 stores an image type management DB 9001, an image capturing device management DB 9002, a display layout management DB 9003, and a required resolution management DB 9004. These DBs 9001, 9002, 9003 and 9004 have the same or the substantially the same data structure as the image type management DB 3001a, the image capturing device management DB 3002a, the display layout management DB 3003a, and the required resolution management DB 3004a of the videoconference terminal 3a, respectively. Therefore, redundant descriptions thereof are omitted below.

(Each Functional Unit of Smartphone 9)

The data exchange unit 91 of the smartphone 9, which is implemented by the far-distance communication circuit 911 illustrated in the FIG. 12, when operating under control of the CPU 901, implements the similar or substantially the similar function to that of the data exchange unit 31a.

The acceptance unit 92, which is implemented by the touch panel 921, when operating under control of the CPU 901, implements the similar or substantially the similar function to that of the acceptance unit 32a.

The image and audio processor 93, which is implemented by instructions of the CPU 901, implements the similar or substantially the similar function to that of the image and audio processor 33a.

The display control 94, which is implemented by instructions of the CPU 901, implements the similar or substantially the similar function to that of the display control 34a.

The determination unit 95, which is implemented by instructions of the CPU 901, implements the similar or substantially the similar function to that of the determination unit 35a.

The generator 96, which is implemented by instructions of the CPU 901, implements the similar or substantially the similar function to that of the generator 36a.

The change unit 97, which is implemented by instructions of the CPU 901, implements the similar or substantially the similar function to that of the change unit 37a.

The communication unit 98, which is implemented by instructions of the CPU 901, implements the similar or substantially the similar function to that of the communication unit 38a.

The data storage/read unit 99, which is implemented by instructions of the CPU 901, stores data or information in the memory 9000 or reads out data or information from the memory 9000.

<Operation>
<Participation Process>

Figure 22:
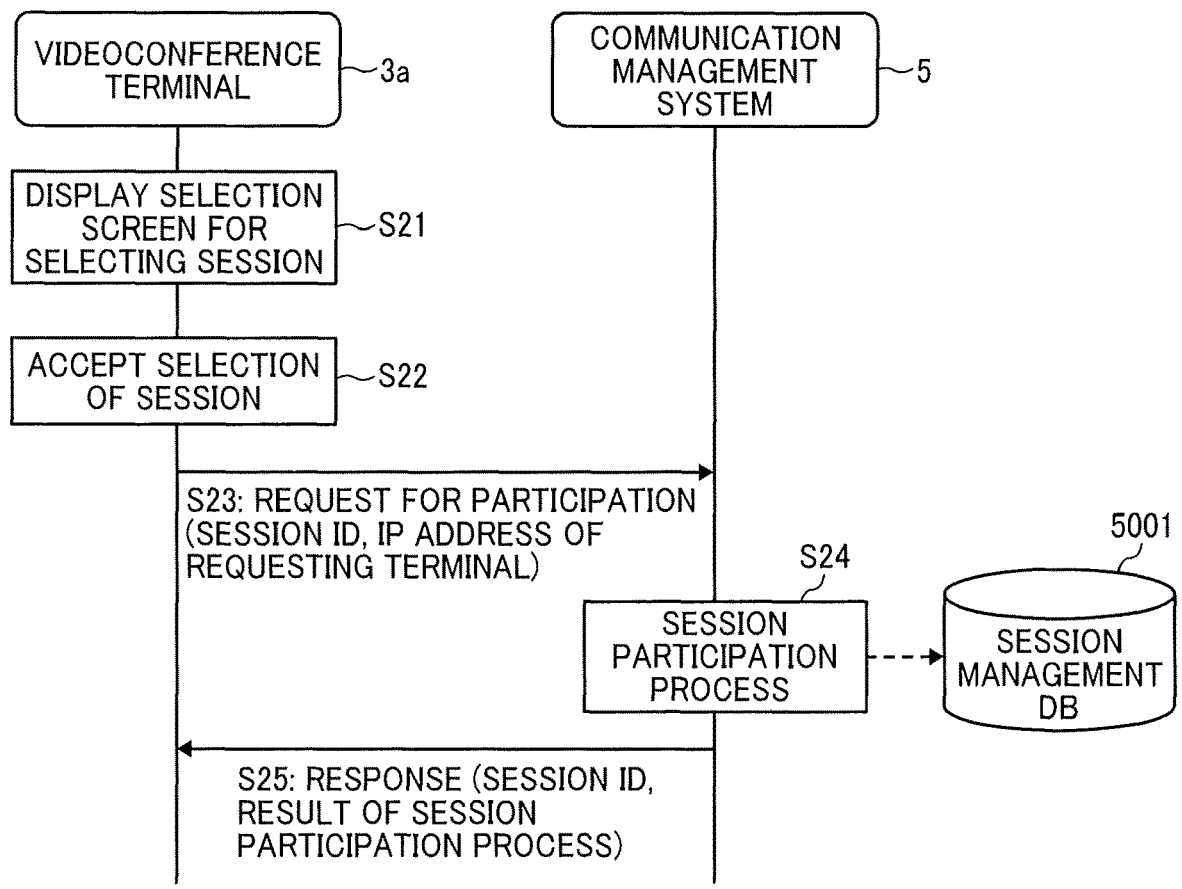
FIG. 22 is a sequence diagram illustrating an operation of participating in a specific communication session according to an embodiment of the present disclosure.
Figure 23:
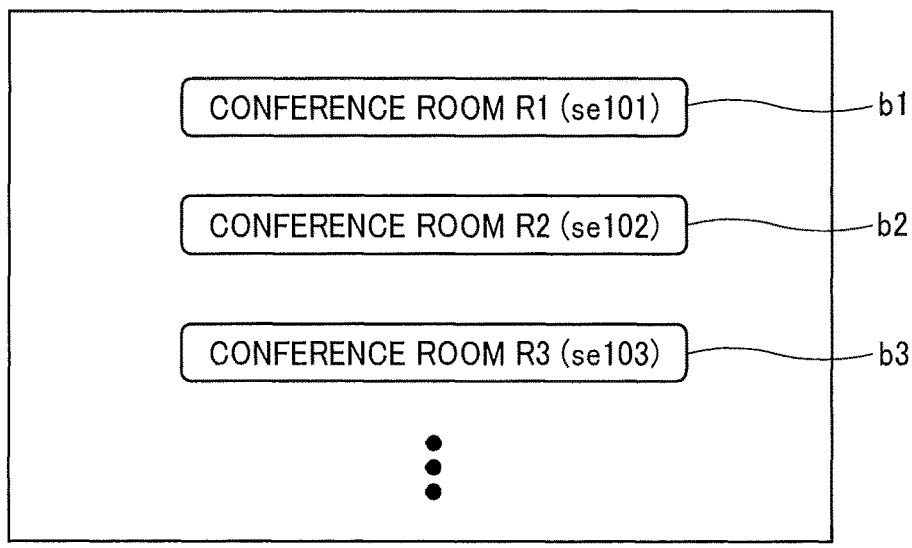
FIG. 23 is a view illustrating a selection screen for accepting selection of a desired communication session (virtual conference), according to an embodiment of the present disclosure.

Referring to FIG. 22 to FIG. 27, a description is given hereinafter of operation according to the present embodiment. Firstly, a process of participating in a specific communication session is described with reference to FIG. 22 and FIG. 23. FIG. 22 is a sequence diagram illustrating an operation of participating in the specific communication session. FIG. 23 is a view illustrating a selection screen for accepting selection of a desired communication session (virtual conference).

First, the acceptance unit 32a of the videoconference terminal 3a accepts an instruction to display the selection screen for the communication session (virtual conference room), which is input by a user (e.g., the user A1) at the site A. Then, the display control 34a controls the display 4a to display the selection screen as illustrated in FIG. 23 (S21). The selection screen displays selection buttons b1, b2, and b3, which respectively represent virtual conference rooms R1, R2, R3, each being a selection target. Each of the selection buttons b1, b2, and b3 is associated with the session ID.

When the user A1 selects a desired selection button (in this example, the selection button b1) on the selection screen, the acceptance unit 32a accepts selection of a communication session (S22). Then, the data exchange unit 31a transmits a request for participating in a virtual conference room to the communication management system 5 (S23). This participation request includes the session ID identifying the communication session for which the selection is accepted at S22, and the IP address of the videoconference terminal 3a as a request sender terminal. The communication management system 5 receives the participation request at the data exchange unit 51.

Next, the data storage/read unit 99 performs a process for enabling the videoconference terminal 3a to participate in the communication session (S24). More specifically, in the session management DB 5001 (FIG. 19), the data storage/read unit 99 adds the IP address that is received at S23 to a field of the participating terminal IP address in a record of the same session ID as the session ID that is received at S23. The data exchange unit 51 transmits a response to the participation request to the videoconference terminal 3a (S25). This response to the participation request includes the session ID that is received at S23, and a result of the participation process. The videoconference terminal 3a receives the response to the participation request at the data exchange unit 31a. The following describes a case in which the process for enabling the videoconference terminal 3a to participate in the communication session is successfully completed.

<Management Process of Image Type Information>

Figure 24:
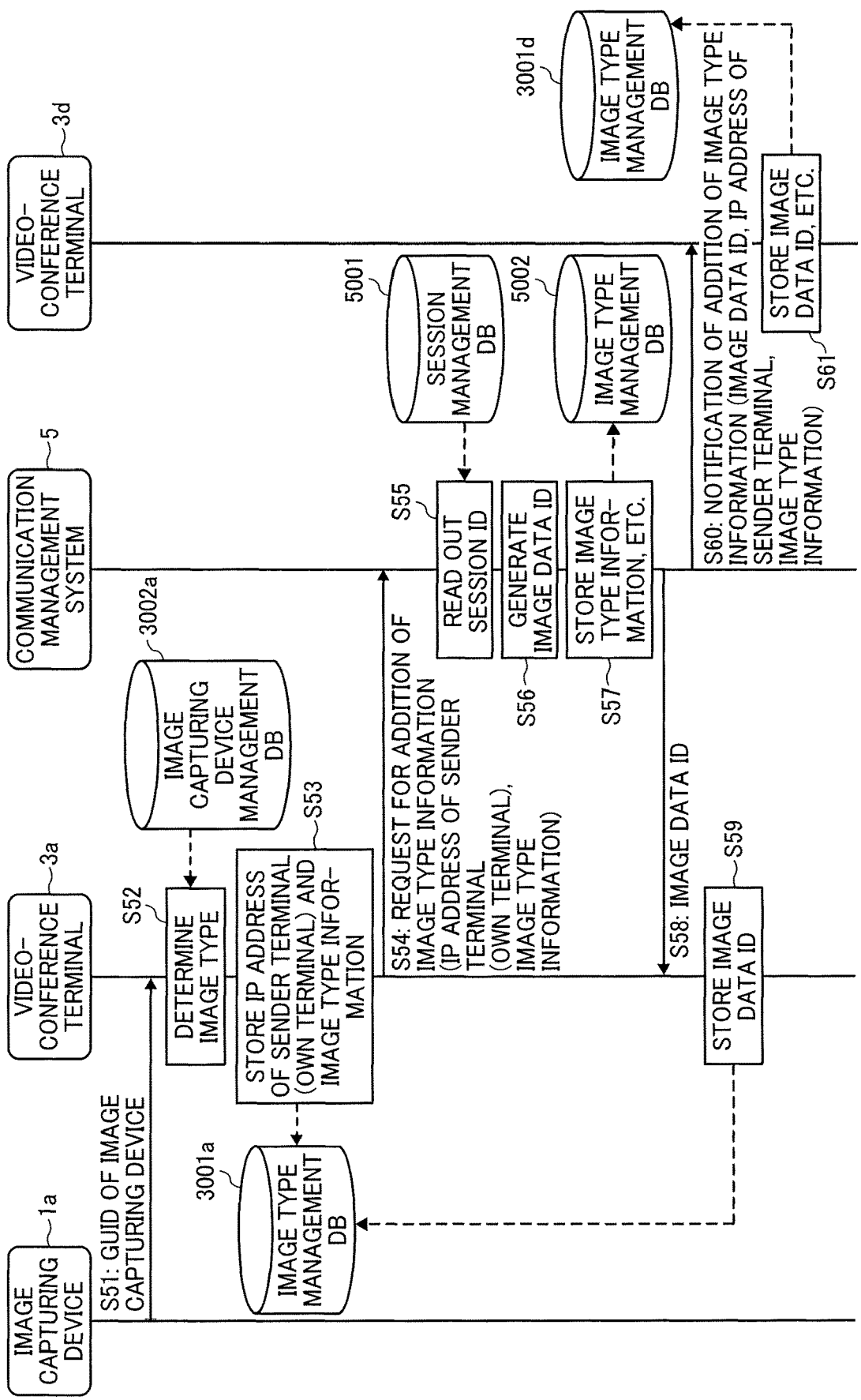
FIG. 24 is a sequence diagram illustrating an operation of managing image type information, according to an embodiment of the present disclosure.

Hereinafter, referring to FIG. 24, a description is given of a management process of the image type information. FIG. 24 is a sequence diagram illustrating an operation of managing the image type information.

First, when a user (e.g., the user A1) at the site A connects the cradle 2a, on which the image capturing device 1a is mounted, to the videoconference terminal 3a, using the wired cable such as a USB cable, the data storage/read unit 19a of the image capturing device 1a reads out the GUID of the own device (e.g., the image capturing device 1a) from the memory 1000a. Then, the communication unit 18a transmits the own device's GUID to the communication unit 38a of the videoconference terminal 3 (S51). The videoconference terminal 3a receives the GUID of the image capturing device 1a at the communication unit 38a.

Next, the determination unit 35a of the videoconference terminal 3a determines whether the same vendor ID and product ID as those of the GUID received at S51 are stored in the image capturing device management DB 3002a (FIG. 16) to determine the image type (S52). More specifically, the determination unit 35a determines that the image capturing device 1a is an image capturing device that captures a special image (a full spherical panoramic image, in this disclosure), based on determination that the same vender ID and product ID are stored in the image capturing device management DB 3002a. By contrast, the determination unit 35a determines that the image capturing device 1a is an image capturing device that captures a general image, based on determination that the same vender ID and product ID are not stored in the image capturing device management DB 3002a.

Next, the data storage/read unit 39a stores, in the image type management DB 3001a (FIG. 15), the IP address of the own terminal (i.e., videoconference terminal 3a) as the sender terminal in association with the image type information, which is a determination result determined at S52 (S53). In this state, the image data ID is not yet associated. Examples of the image type information include the source name that is determined according to a predetermined naming rule, and the image type (general image or special image type).

Then, the data exchange unit 31a transmits a request for adding the image type information to the communication management system 5 (S54). This request for adding image type information includes the IP address of the own terminal as a sender terminal, and the image type information, both being stored at S53 in association with each other. The communication management system 5 receives the request for adding the image type information at the data exchange unit 51.

Next, the data storage/read unit 59 of the communication management system 5 searches the session management DB 5001 (FIG. 19) using the IP address of the sender terminal received at S54 as a search key, to read out the session ID associated with the IP address (S55).

Next, the generator 56 generates a unique image data ID (S56). Then, the data storage/read unit 59 stores, in the image type management DB 5002 (FIG. 20), a new record associating the session ID that is read out at S55, the image data ID generated at S56, the IP address of the sender terminal and the image type information that are received at S54, with one another (S57). The data exchange unit 51 transmits the image data ID generated at S56 to the videoconference terminal 3a (S58). The videoconference terminal 3a receives the image data ID at the data exchange unit 31a.

Next, the data storage/read unit 39a of the videoconference terminal 3a stores, in the image type management DB 3001a (FIG. 15), the image data ID received at S58, in association with the IP address of the own terminal (i.e., videoconference terminal 3a) as the sender terminal and the image type information that are stored at S53 (S59).

Further, the data exchange unit 51 of the communication management system 5 transmits a notification of addition of the image type information to other communication terminal (the videoconference terminal 3d, in this example) (S60). This notification of addition of the image type information includes the image data ID generated at S56, and the IP address of the own terminal (i.e., videoconference terminal 3a) as the sender terminal and the image type information that are stored at S53. The videoconference terminal 3d receives the notification of addition of the image type information at the data exchange unit 31a. The destination to which the data exchange unit 51 transmits the notification is other IP address that is associated with the same session ID as that associated with the IP address of the videoconference terminal 3a in the session management DB 5001 (FIG. 19). In other words, the destination is other communication terminal that is in the same virtual conference room as the videoconference terminal 3a.

Next, the data storage/read unit 39d of the videoconference terminal 3d stores, in the image type management DB 3001d (FIG. 15), a new record associating the image data ID, the IP address of the sender terminal, and the image type information, which are received at S60 (S61). In substantially the same manner, the notification of addition of the image type information is transmitted to the PC 7 and the smartphone 9, each being other communication terminal. The PC 7 and the smartphone 9 each stores the image data ID, the IP address of the sender terminal, and the image type information, in corresponding one of the image type management DBs 7001 and 9001. Through the operation as described heretofore, the same information is shared among the communication terminals in the image type management DBs 3001a, 3001d, 7001 and 9001, respectively.

<Resolution Request Process>

Figure 25:
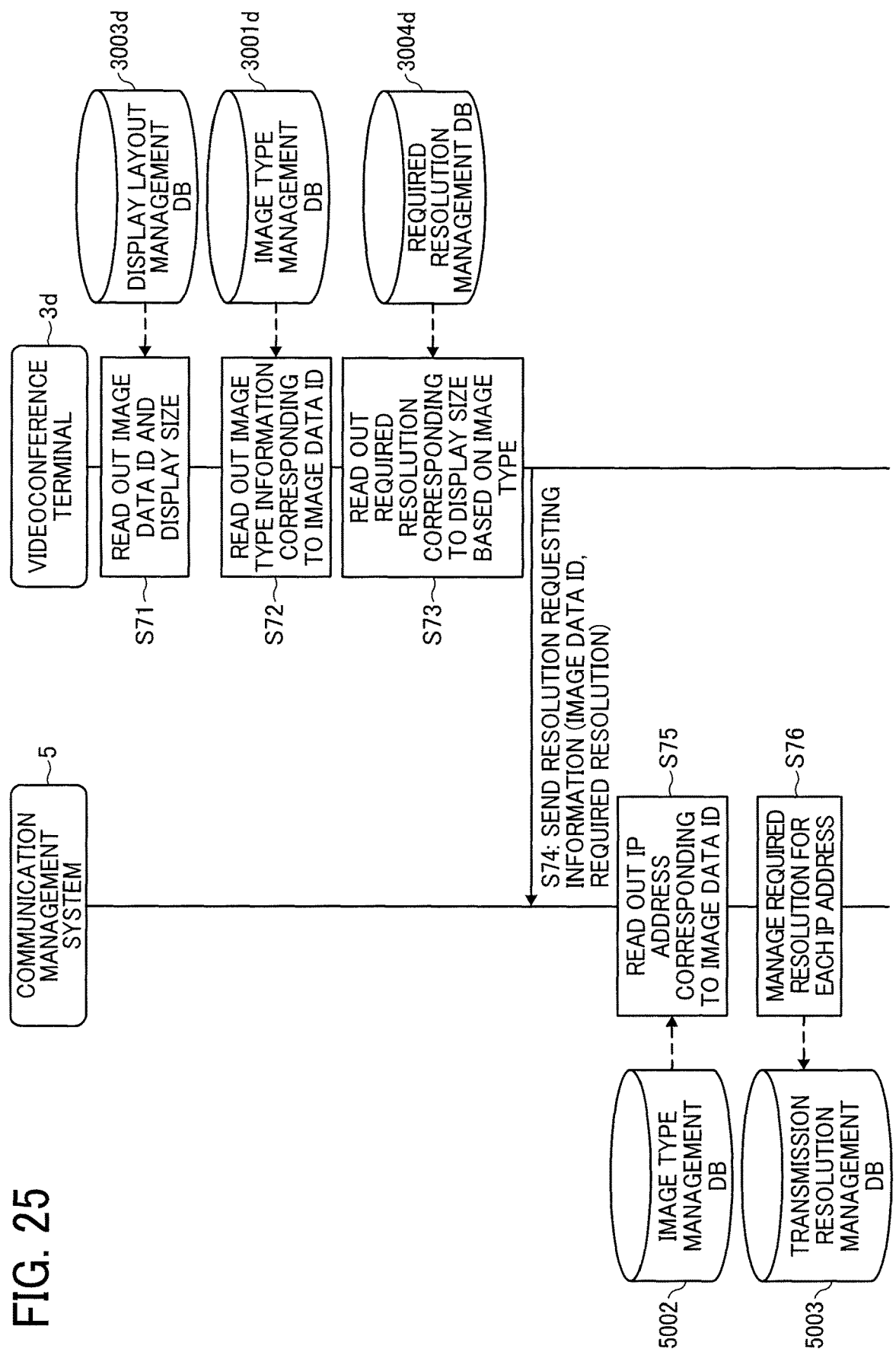
FIG. 25 is a sequence diagram illustrating an operation of requesting resolution, according to an embodiment of the present disclosure.

Hereinafter, referring to FIG. 25, a description is given of a resolution request process. FIG. 25 is a sequence diagram illustrating an operation of requesting the resolution.

As illustrated in FIG. 25, the data storage/read unit 39a of the videoconference terminal 3d reads out each information item of the image data ID and the display size from the display layout management DB 3003d (FIG. 17D) (S71). Then, the data storage/read unit 39a searches the image type management DB 3001d (FIG. 15) using the image data ID that is read out at S71 as a search key, to read out the image type information associated with the image data ID (S72). Next, the data storage/read unit 39a selects the table of FIG. 18A or the table of FIG. 18B in the required resolution management DB 3004d based on the image type information that is read out at S72. Further, the data storage/read unit 39a searches the selected table using the display size that is read out at S71 as a search key to read out information indicating the required resolution associated with the display size (S73).

Next, the data exchange unit 31d of the videoconference terminal 3d transmits resolution request information indicating a request of the resolution to the communication management system 5 (S74). This resolution request information contains the image data ID that is read out at S71 and the required resolution that is read out at S73. The communication management system 5 receives the resolution request information at the data exchange unit 51.

Next, the data storage/read unit 59 of the communication management system 5 searches the image type management DB 5002 (FIG. 20) using the image data ID received at S74 as a search key, to read out the IP address of the sender terminal associated with the image data ID (S75). Then, the data storage/read unit 59 stores the required resolution received at S75 in accordance with the IP address that is read out at S75 in the transmission resolution management DB 5003 (S76).

A description is given heretofore of an example in which the videoconference terminal 3d transmits the resolution request information to the communication management system 5, with reference to FIG. 25. Other communication terminals (videoconference terminal 3a, PC 7, and smartphone 9) also perform the same or substantially the same operation as the videoconference terminal 3d. Accordingly, redundant description thereof is omitted below. As all the communication terminals perform the operation as illustrated in FIG. 25, all the required resolutions are filled in the transmission resolution management DB 5003 as illustrated in FIG. 21.

<Image Data Transmission Process>

Hereinafter, referring to FIGS. 26 to 28, a description is given of an image data transmission process in video calling. FIG. 26 is a sequence diagram illustrating an image data transmission process in video calling.

First, the communication unit 18a of the image capturing device 1a transmits image data and audio data obtained by capturing a subject or surroundings to the communication unit 38a of the videoconference terminal 3a (S101). In this case, because the image capturing device 1a is a device that is capable of obtaining two hemispherical images from which a full spherical panoramic image is generated, the image data is configured by data of the two hemispherical images as illustrated in FIGS. 3A and 3B. The videoconference terminal 3a receives the image data and the audio data at the communication unit 38a.

Next, the data exchange unit 31a of the videoconference terminal 3a transmits, to the communication management system 5, the image data and the audio data received from the image capturing device 1a (S102). This transmission includes an image data ID for identifying the image data as a transmission target. Thus, the communication management system 5 receives the image data and the image data ID at the data exchange unit 51.

Next, the resolution controller 53 performs control to change the resolution of the image data received at S102, based on the required resolution stored in the transmission resolution management DB 5003 (S103). When the resolution of the image data received at S102 is the same as the required resolution managed in the transmission resolution management DB 5003, the resolution controller 53 performs control not to change the resolution of the image data.

Next, the data exchange unit 51 of the communication management system 5 transmits, to the videoconference terminal 3d, the image data on which the control of resolution has been already performed at S103 and the audio data (S104). This transmission includes an image data ID for identifying the image data as a transmission target. Thus, the videoconference terminal 3d receives the image data, the image data ID, and the audio data at the data exchange unit 31d.

Next, the data storage/read unit 39d of the videoconference terminal 3d searches the image type management DB 3001d (FIG. 15) using the image data ID received at S104 as a search key, to read out the image type information (source name) associated with the image data ID (S105). When the image type information indicates a special image (full spherical panoramic image, in this disclosure), i.e., when the image type information is "Video_Theta", the image and audio processor 33d generates a full spherical panoramic image from the image data received at S104, and further generates a predetermined-area image (S106).

Next, the data storage/read unit 39d searches the display layout management DB 3003d (FIG. 17D) using the image data ID received at S104 as a search key to read out the layout number associated with the image data ID, thereby determining a display area for displaying an image relating to the image data received at S104 from the plurality of display areas of the display 4d (S107). Then, the display control 34d displays the predetermined-area image in the display area determined at S107 (S108). When the image type information indicates a general image, i.e., when the image type information is "Video", the image and audio processor 33d does not generate a full spherical panoramic image from the image data received at S104. In this case, the display control 34d displays a general image.

Figure 27A:
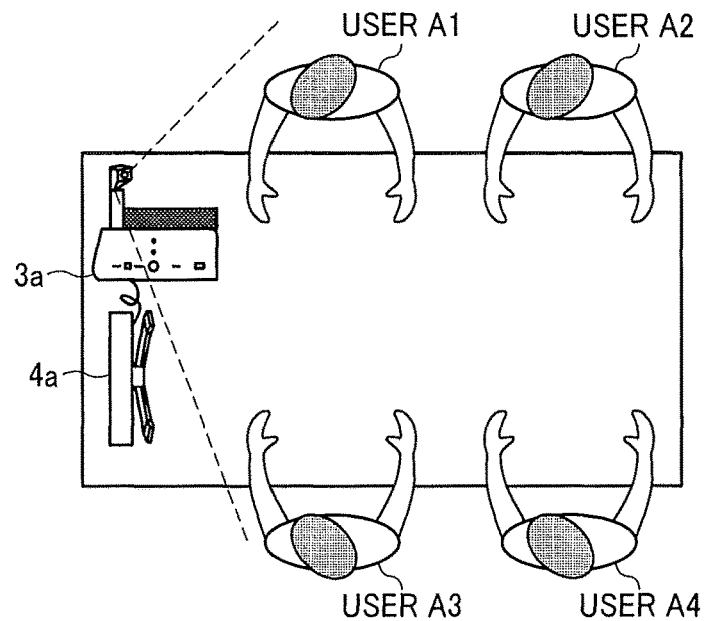
FIG. 27A illustrates an example state of video calling in a case which the image capturing device of FIGS. 1A to 1C is not used, according to an embodiment of the present disclosure.
Figure 27B:
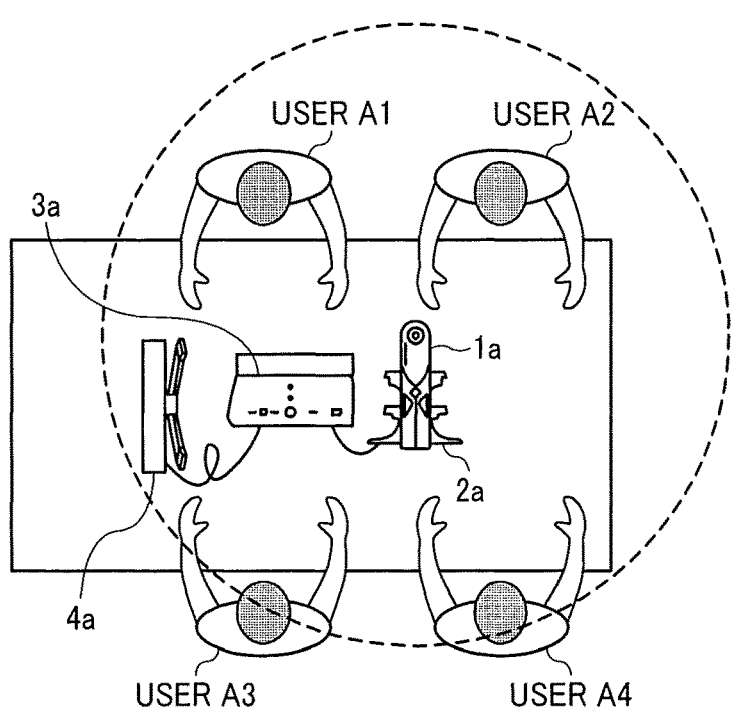
FIG. 27B illustrates an example state of video calling in a case which the image capturing device of FIGS. 1A to 1C is used, according to an embodiment of the present disclosure.

Next, referring to FIGS. 27A and 27B, a description is given of a state of video calling. FIGS. 27A and 27B illustrate example states of video calling. More specifically, FIG. 27A illustrates a case in which the image capturing device 1a is not used, while FIG. 27B illustrates a case in which the image capturing device 1a is used.

First, as illustrated in FIG. 27A, when the camera 312 (FIG. 10) that is built into the videoconference terminal 3a is used, that is, without using the image capturing device 1a, the videoconference terminal 3a has to be placed at the corner of a desk, so that the users A1 to A4 can be captured with the camera 312, because the angle of view is horizontally 125 degrees and vertically 70 degrees. This requires the users A1 to A4 to talk while looking in the direction of the videoconference terminal 3a. Further, because the user A1 to A4 look in the direction of the videoconference terminal 3a, the display 4a has also to be placed near the videoconference terminal 3a. This requires the user A2 and the user A4, who are away from the videoconference terminal 3a, to talk in a relatively loud voice, because they are away from the microphone 314 (FIG. 10). Further, it may be difficult for the user A2 and A4 to see contents displayed on the display 4a.

By contrast, as illustrated in FIG. 27B, when the image capturing device 1a is used, the videoconference terminal 3a and the display 4a can be placed relatively at the center of the desk, because the image capturing device 1a is capable of obtaining two hemispherical images from which a full spherical panoramic image is generated. This enables the users A1 to A4 to talk in a relatively small voice, because they are close to the microphone 314. Further, it gets easier for the users A1 to A4 to see contents displayed on the display 4a.

Hereinafter, referring to FIGS. 28A and 28B, a description is given of a display example on the display 4d at the site D. FIGS. 28A and 28B are views, each illustrating a display example on the display 4a at the site D. More specifically, FIG. 28A is a view illustrating an example in which image data transmitted from respective ones of the image capturing device 1a (videoconference terminal 3a) and the image capturing device 1b (smartphone 9) are displayed as they are, that is, without generating a full spherical panoramic image and a predetermined-area image. FIG. 28B is a view illustrating an example in which predetermined-area images are displayed, which are generated based on full spherical panoramic images generated from the image data transmitted from the image capturing device 1a (videoconference terminal 3a) and the image capturing device 1b (smartphone 9), respectively. In this example, an image of the site A is displayed in a left-side display area (layout number "1") of the display 4d. In an upper-right display area (layout number "2"), an image of the site B is displayed. Further, in a middle-right display area (layout number "3") of the display 4d, an image of the site C is displayed. In a lower-right display area (layout number "4"), an image of the site D (own site) is displayed.

When the image data transmitted from respective ones of the image capturing device 1a (videoconference terminal 3a) and the image capturing device 1b (smartphone 9), each being capable capturing a full spherical panoramic image, are displayed as they are, images are displayed as illustrated in FIG. 28A. In other words, the images of the site A and the site B are displayed as the front-side hemispherical image as illustrated in FIG. 3A and the back-side hemispherical image as illustrated in FIG. 3B.

By contrast, when the image and audio processor 33d generates a full spherical panoramic image from the image data transmitted from respective ones of the image capturing device 1a (videoconference terminal 3a) and the image capturing device 1b (smartphone 9), each being capable of obtaining two hemispherical images from which the full spherical panoramic image is generated, and further generates a predetermined-area image, the predetermined-area image, which is a planar image, is displayed as illustrated in FIG. 28B. Further, in both of FIGS. 28A and 28B, the general image is displayed in the display areas of the site C and site D, because the image capturing device 8 and the camera 312 built in the videoconference terminal 3d, each being an image capturing device that obtains a general image, are used in the site C and the site D, respectively.

Furthermore, a user is able to change a predetermined area for the predetermined-area image in the same full spherical panoramic image. More specifically, when the user D1, D2 or D3 operates the operation key 308 or moves his/her finger on the touch panel of the display 4d, the acceptance unit 32d detects an instruction for moving the image. The display control 34d shifts, rotates, reduces, or enlarges the predetermined-area image based on the instruction detected by the acceptance unit 32d. This enables to shift the predetermined-area image so that the user A3 and the user A4 are displayed, even in a case in which the predetermined-area image displayed according to an initial setting (by default) contains only a part of the users at the site A, that is, the user A1 and the user A2 as illustrated in FIG. 28B.

As described heretofore, according to the present embodiment, the communication terminal such as the videoconference terminal 3a generates a full spherical panoramic image, and further generates a predetermined-area image, depending on the image type information associated with the image data ID that is transmitted along with image data. This prevents the front side hemispherical image and the back side hemispherical image from being displayed as illustrated in FIG. 28A.

In addition, the resolution of image data requested to the communication management system 5 is controlled depending on image types (S103). This prevents the resolution of an image displayed on a display from getting too low, and thereby preventing a user who views the image on the display from having difficulty in recognizing the surroundings or attendants of a communication counterpart.

<Variations>

Figure 29:
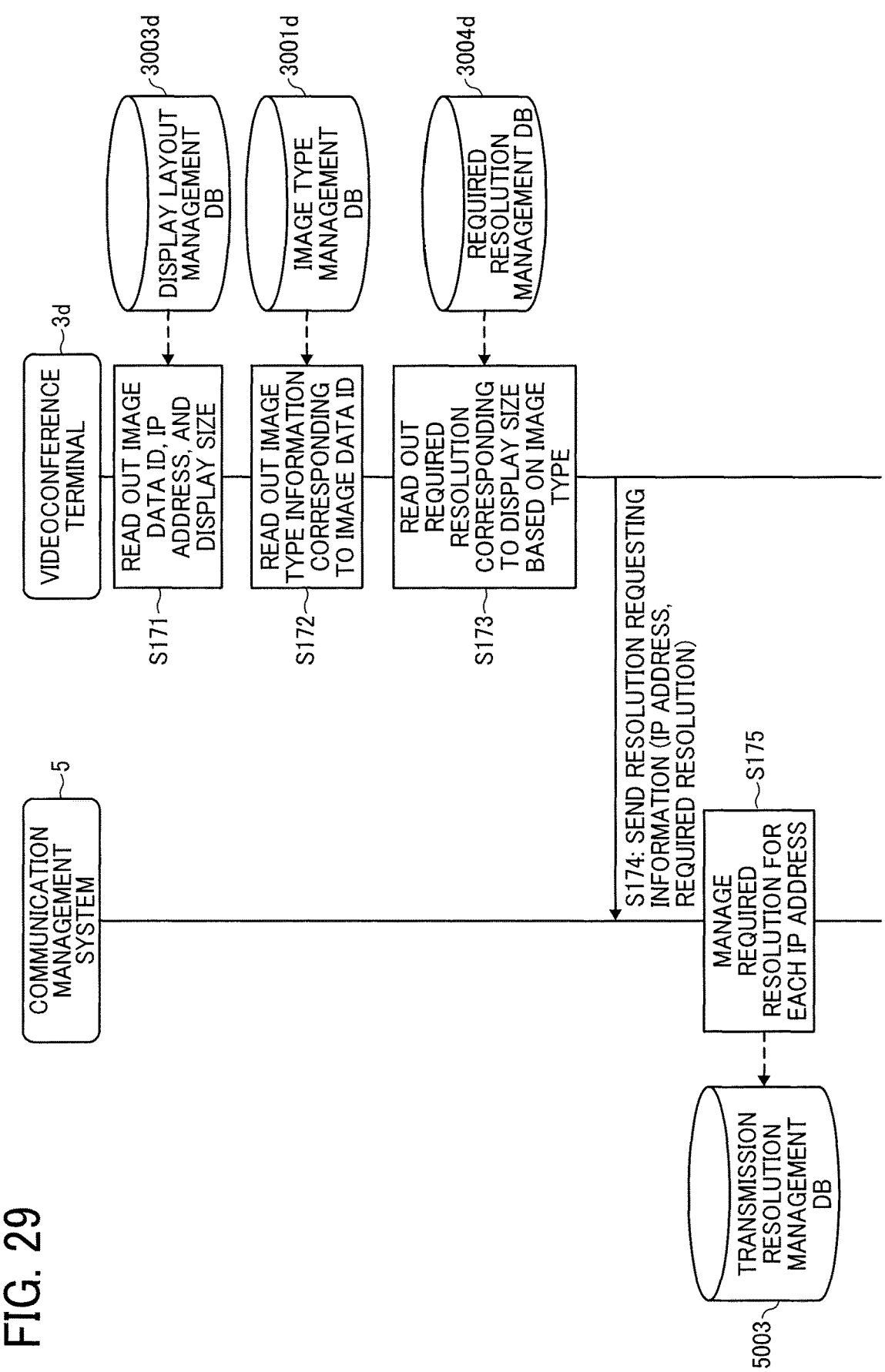
FIG. 29 is a sequence diagram illustrating another example of an operation of requesting the resolution, according to an embodiment of the present disclosure.

Hereinafter, referring to FIG. 29, a description is given of another example of the request process of the resolution. FIG. 29 is a sequence diagram illustrating another example of an operation of requesting the resolution.

In the above example described with reference to FIG. 25, at S71, the data storage/read unit 39d reads out the image data ID and the display size from the display layout management DB 3003d. By contrast, in this example, the data storage/read unit 39d reads out the IP address in addition to the image data ID and the display size (S171). Then, the data storage/read unit 39d performs the same or substantially the same processes as the above-described steps S72 and S73 (S172, S173).

Further, in the above example described with reference to FIG. 25, at S74, the data exchange unit 31d transmits the resolution request information including the image data ID and the required resolution. By contrast, in this example, the data exchange unit 31d transmits the resolution request information including the IP address that is read out at S171 in place of the image data ID (S174).

The communication management system 5 does not have to perform the same or substantially the same process as S75 of FIG. 25, because the communication management system 5 receives the IP address at S174. Accordingly, after S174, the data storage/read unit 59 performs the same or substantially the same process as S76 (S175).

According to an embodiment of the present disclosure, the resolution of image data requested to an image management system is controlled depending on image types. This prevents the resolution of an image displayed on a display from getting too low, and thereby preventing a user who views the image on the display from having difficulty in recognizing the surroundings or attendants of a communication counterpart.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A communication terminal comprising:
a memory to store, for each image type information indicating a type of image data, sizes of a plurality of display areas, each display area being a divided area divided from an entire area displayable by a display, in association with required resolutions of image data to be displayed in the corresponding display areas; and
circuitry to:
receive, from a communication management system, specific image type information indicating a type of specific image data transmitted from other communication terminal; and
transmit, to the communication management system, specific required resolution, which is a resolution stored in the memory for the specific image type information in association with the size of one of the display areas in which the specific image data is to be displayed,
wherein the type of image data indicated by the image type information includes one of a planar image and a full spherical panoramic image,
wherein the specific required resolution is higher for the full spherical panoramic image than for the planar image, and
wherein the circuitry generates data of a full spherical panoramic image based on the specific image data transmitted from the other communication terminal, based on a determination that the specific image type information indicates that the type of the specific image data is the full spherical panoramic image.

2. The communication terminal of claim 1, wherein
the memory further stores, for a plurality of layout numbers collectively indicating a layout of the display areas, image data identification information for identifying each image data to be displayed in each of the display areas according to the layout, in association with the sizes of display areas,
the circuitry receives, from the communication manangement system, specific image data identification information for identifying the specific image data transmitted from the other communication terminal in addition to the specific image type information, and
the specific required resolution is stored in the memory in association with the size of one of the display areas in which the specific image data is to be displayed, which is a size stored in the memory in association with the received specific image data identification information.

3. The communication terminal of claim 2, wherein the circuitry further changes association between the image data identification information and the layout numbers that are stored in the memory.

4. The communication terminal of claim 1, wherein the communication terminal is one of a video conference terminal, a personal computer, a smartphone, a digital television, a smartwatch, and a car navigation system.

5. A communication system comprising:
the communication terminal of claim 1; and
the communication management system configured to control resolution of the image data transmitted from the other communication terminal according to the specific required resolution transmitted from the communication terminal.

6. The communication terminal of claim 1, wherein
when the image type information indicates the full spherical panoramic image, the specific required resolution is at least double a resolution in one dimension of a display onto which the full spherical panoramic image is to be displayed, and
when the image type information indicates the planar image, the specific required resolution is within ten percent of a resolution in one dimension of the display onto which the planar image is to be displayed.

7. A communication method performed by a communication terminal, the method comprising:
storing in a memory, for each image type information indicating a type of image data, sizes of a plurality of display areas each display area being a divided area divided from an entire area displayable by a display, in association with required resolutions of image data to be displayed in the corresponding display areas;
receiving, from a communication management system, specific image type information indicating a type of specific image data transmitted from other communication terminal; and
transmitting, to the communication management system, specific required resolution, which is a resolution stored in the memory for the specific image type information in association with the size of one of the display areas in which the specific image data is to be displayed,
wherein:
the receiving includes receiving, from the communication management system, specific image data identification information for identifying the specific image data transmitted from the other communication terminal in addition to the specific image type information, and
the type of image data indicated by the image type information includes one of a planar image and a full spherical panoramic image,
wherein the specific required resolution is higher for the full spherical panoramic image than for the planar image,
the method further comprising generating data of a full spherical panoramic image based on the specific image data transmitted from the other communication terminal, based on a determination that the specific image type information indicates that the type of the specific image data is the full spherical panoramic image.

8. The communication method of claim 7, further comprising:
storing in the memory, for a plurality of layout numbers collectively indicating a layout of the display areas, image data identification information for identifying each image data to be displayed in each of the display areas according to the layout, in association with the sizes of display areas,
wherein the specific required resolution is stored in the memory in association with the size of one of the display areas in which the specific image data is to be displayed, which is a size stored in the memory in association with the received specific image data identification information.

9. The method of claim 8, further comprising changing association between the image data identification information and the layout numbers that are stored in the memory.

10. The method of claim 7, wherein
when the image type information indicates the full spherical panoramic image, the specific required resolution is at least double a resolution in one dimension of a display onto which the full spherical panoramic image is to be displayed, and
when the image type information indicates the planar image, the specific required resolution is within ten percent of a resolution in one dimension of the display onto which the planar image is to be displayed.

11. A method of displaying image data performed by a communication terminal, the method comprising:
receiving image data and an image data identifier for identifying the image data, the image data having a resolution that has been controlled based on an image type of the image data and a size of one of a plurality of display areas in which the image data is to be displayed, each display area being a divided area divided from an entire area displayable by a display;
reading out image type information stored in a memory in association with the received image data identifier, the image type information includes one of a planar image and a full spherical panoramic image;
generating a full spherical panoramic image based on the read-out image type information;
determining the one of the display areas in which the image data to be displayed based on one of a plurality of layout numbers stored in the memory in association with the received image data identifier; and
displaying the generated image on the determined one of the display areas,
wherein the resolution is higher for the full spherical panoramic image than for the planar image.

12. The method of claim 11, wherein
when the image type indicates the full spherical panoramic image, the resolution is at least double a resolution in one dimension of a display onto which the full spherical panoramic image is displayed, and
when the image type indicates the planar image, the resolution is within ten percent of a resolution in one dimension of the display onto which the planar image is to be displayed.

* * * * *